(12) United States Patent
Satoh et al.

(10) Patent No.: US 7,044,651 B2
(45) Date of Patent: May 16, 2006

(54) FERRULE HEATING APPARATUS AND METHOD OF ADHERING FERRULE AND OPTICAL FIBER

(75) Inventors: Tsuguo Satoh, Matsudo (JP); Kunio Yamada, Matsudo (JP); Takehiko Narita, Matsudo (JP); Tatsuya Fujiwara, Matsudo (JP); Yuichi Arai, Matsudo (JP)

(73) Assignee: Seikoh Giken Co., Ltd., (JP)

( * ) Notice: Subject to any disclaimer, the term of this patent is extended or adjusted under 35 U.S.C. 154(b) by 170 days.

(21) Appl. No.: 10/602,664

(22) Filed: Jun. 25, 2003

(65) Prior Publication Data

US 2004/0057674 A1 Mar. 25, 2004

(30) Foreign Application Priority Data

Jun. 27, 2002 (JP) .......................... P2002-187051

(51) Int. Cl.
*G02B 6/36* (2006.01)
(52) U.S. Cl. ......................................... 385/80; 385/78
(58) Field of Classification Search ................. 385/76, 385/78, 80
See application file for complete search history.

(56) References Cited

U.S. PATENT DOCUMENTS

| 5,621,835 | A  | * | 4/1997 | Takahashi et al. ............ 385/78 |
| 6,409,394 | B1 | * | 6/2002 | Ueda et al. ................... 385/80 |
| 6,698,940 | B1 | * | 3/2004 | Wang et al. .................. 385/92 |
| 6,895,654 | B1 | * | 5/2005 | Strandberg et al. ........ 29/564.1 |

FOREIGN PATENT DOCUMENTS

| JP |     11305062 A | * | 11/1999 |
| JP |     11305063 A | * | 11/1999 |
| JP |   2000275474 A | * | 10/2000 |
| JP |     2003-315613 |   | 11/2003 |

\* cited by examiner

*Primary Examiner*—Akm Enayet Ullah
*Assistant Examiner*—Daniel Petkovsek
(74) *Attorney, Agent, or Firm*—Blank Rome LLP

(57) ABSTRACT

A ferrule heating apparatus 1, which is configured to heat a ferrule and thereby adhere an optical fiber and the ferrule together, includes a plurality of ferrule housing portions capable of freely housing and aligning ferrules 27, a holder 5 made of a thermally conductive member, a holder heating unit 9 for supporting and heating the holder 5, and a temperature control unit 11 for controlling a temperature of the holder heating unit 9. The holder heating unit 9 and the temperature control unit 11 are provided mutually separately. Meanwhile, the holder heating unit 9 and the temperature unit 11 are mutually connected to each other through an electric power cable 13.

5 Claims, 17 Drawing Sheets

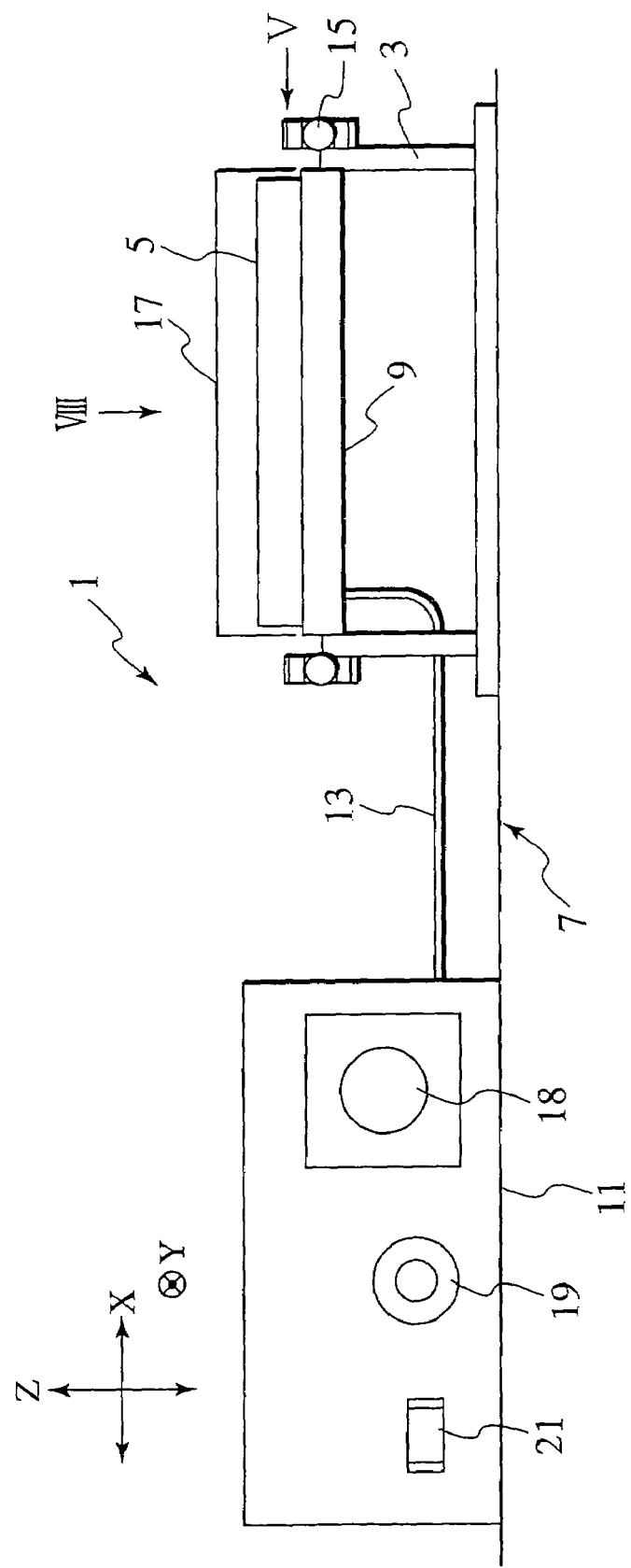

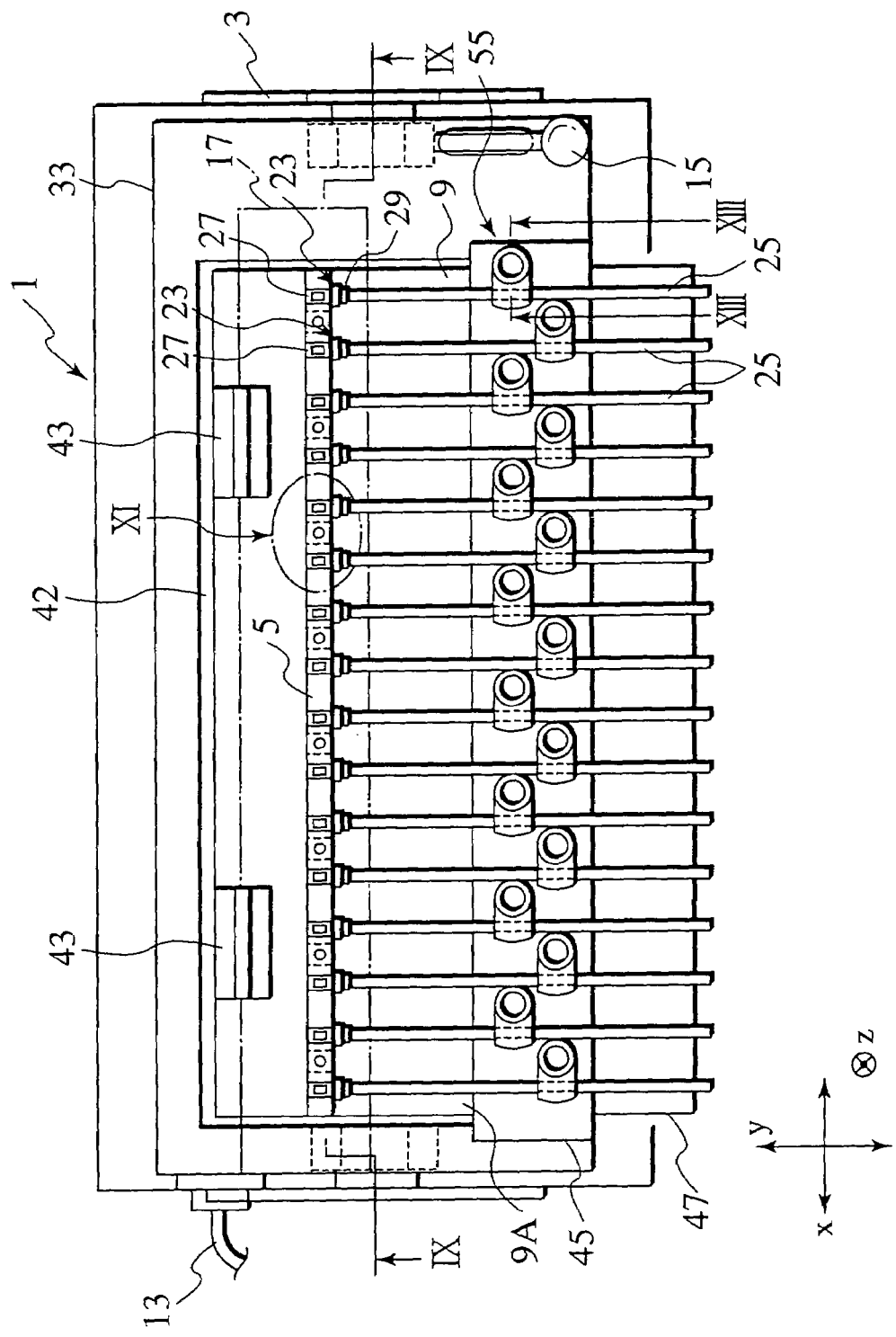

FERRULE HEATING APPARATUS AND METHOD OF ADHERING FERRULE AND OPTICAL FIBER

BACKGROUND OF THE INVENTION

1. Field of the Invention

The present invention relates to a ferrule heating apparatus for heating a ferrule when an optical fiber and a ferrule are adhered each other using a thermosetting adhesive agent by inserting one end side of the optical fiber into an optical fiber insertion through hole being provided on the ferrule. More specifically, the present invention relates to a ferrule heating apparatus in which a ferrule heating unit for heating the ferrule and a temperature control unit for controlling the temperature of this ferrule heating unit are mutually separated.

2. Description of the Related Art

Previously, a ferrule heating apparatus has been disclosed in Japanese Patent Application No. 2002-077022. FIG. 1 is a front view showing a schematic constitution of the previously disclosed ferrule heating apparatus 100. FIGS. 2A and 2B are views showing a holder 102 provided in the ferrule heating apparatus 100 for housing ferrules in which optical fibers are inserted for heating. FIG. 2A is a plan view of the holder 102, and FIG. 2B is a cross-sectional view taken along the II—II line in FIG. 2A.

FIG. 3 is an enlarged cross-sectional view showing a state of aligning a ferrule into a housing position, where the optical fibers are inserted into ferrule housing holes 104 provided in a plurality on the holder 102.

The ferrule heating apparatus 100 includes the holder 102 for housing and aligning ferrules 106 being in a state that a tip side (one end side) of an optical fiber 110 is inserted into an optical fiber insertion through hole 108 (see FIG. 3) provided on the ferrule 106, heating means 112 for heating one side-face side (a lower face side) of the holder 102, holder heating unit moving means 116 for moving a holder heating unit 114 provided on the heating means 112 approximately in the vertical direction (the AR direction, the arrow, as shown in FIG. 1) such that the holder heating unit 114 approaches/contacts (in the +Z direction) or moves away (in the −Z direction) to/from the holder 102, and optical fiber retaining means 118 for retaining the numerous optical fibers 110 extending in the upper direction (the +Z direction) from the ferrules 106 which are housed and aligned in the holder 102. Moreover, the holder 102 and the optical fiber retaining means 118 are supported by base frames 120.

The holder 102 is made of a member having good heat conductance such as metal, and is formed into a rectangular solid shape as shown in FIGS. 2A and 2B. The holder 102 is fixed to the base frames 120 such that two faces having the largest areas among the six faces of this rectangular solid are set horizontal (in the X-Y direction). Moreover, the base frames 120 are disposed on upper faces of a work table, for example.

Of the holder 102, a lower side face among the two faces having the largest areas constitutes a holder heating unit contact surface 122 for contacting the holder heating unit 114, and the plurality of the ferrule housing holes 104 for housing and aligning the ferrules 106 are pierced approximately perpendicularly to the holder heating unit contact surface 122. The layout of the ferrules are set as 12 pieces×2 lines=24 pieces, for example. As shown in FIG. 3, the ferrule housing hole 104 has a constitution in which a small-diameter hole portion 104A on a lower side and a large-diameter hole portion 104B on an upper side are formed coaxially.

Next, description will be made regarding a state where the optical fiber 110 is inserted into the ferrule 106 and a state where the ferrule 106 after insertion of the optical fiber 110 is housed and aligned in the ferrule housing hole 104 provided on the holder 102.

As shown in FIG. 3, a bare optical fiber portion (a tip portion) 110A of the optical fiber 110, where a covering on one end side is removed and the bare optical fiber is thereby exposed, is inserted into the fiber insertion hole (the through hole) 108 of the ferrule 106 in which a thermosetting adhesive agent is filled in advance. The tip portion 110A of the optical fiber 110 slightly protrudes out of the fiber insertion hole 108 on a tip portion (a tip face) side of the ferrule 106. This slightly protruding portion of the tip portion 110A is set slightly inside from the holder heating unit contact surface 122 of the holder 102. Here, the end face of the tip portion 110A of the optical fiber 110 slightly protruding out of the end face of the ferrule 106 is polished in a subsequent step.

On a base end side of the ferrule 106, i.e. on the side of the extending (stretched) optical fiber 110 without removing the covering (the opposite side to the protrusion of the bare optical fiber portion 110A), there is provided a metal flange 124 so as to envelop the optical fiber 110.

As described above, the ferrule 106, in which the bare optical fiber portion 110A is inserted on the tip side, and in which the metal flange 124 is provided on the base end side, is housed and aligned in the housing hole 104 including the small-diameter portion 104A and the large-diameter portion 104B such that the tip side of the ferrule 106 is positioned on the holder heating unit contact surface 122 side while the metal flange 124 on the based end side is positioned on the opposite side to the holder heating unit contact surface 122.

As shown in FIG. 1, the heating means 112 is configured by the vertically movable holder heating unit 114 for heating the holder 102 by contacting the holder heating unit contact surface 122, i.e. the lower face, of the holder 102, and a heater main body (a temperature control unit) 126 including a controller for controlling a temperature of this holder heating unit 114 as in a conventional example and a timer for regulating heating time.

The holder heating unit 114 includes an upper face, which contacts the holder heating unit contact surface 122 being formed on the lower face of the holder 102, as a holder contact surface 128. The holder contact surface 128 is formed into a planar shape and is set approximately horizontal so that the holder contact surface 128 can contact the entire holder heating unit contact surface 122. Moreover, the holder contact surface 128 is formed into an approximately rectangular shape, and the area thereof is formed into dimensions equal to or slightly larger than the holder heating unit contact surface 122 provided on the holder 102.

Meanwhile, the holder heating unit 114 moves in the vertical direction (in the direction indicated with the arrow AR in FIG. 1) by use of the holder heating unit moving means 116. Accordingly, the holder contact surface 128 is regulated to approach, contact, or move away from the holder heating unit contact surface 122 provided on the lower face of the holder 102.

The optical fiber retaining means 118 includes a rotating member 130 of a pipe shape which is set horizontal and freely rotatable, and an elastic member 134 made of a sponge (or other sponge-like synthetic resin, rubber or the like) which includes a plurality of nicks 132 for sandwiching and thereby holding the optical fibers 110. Both end portions of the rotating member 130 are respectively supported by the base frames 120.

The rotating member 130 is provided approximately parallel to the longitudinal direction of the holder 102 and also horizontally, and is disposed in a position above the holder 102.

Next, description will be made regarding an operation of the ferrule heating apparatus. First, in a state where the holder 102 and the holder heating unit 114 are separated vertically from each other while a power source of the heater is turned off, the plurality of ferrules 106, in which the optical fibers 110 are inserted, are respectively housed and aligned one-by-one in the plurality of ferrule housing holes 104 provided on the holder 102 as shown in FIG. 3. Upon this alignment, the optical fibers 110 extending from the ferrules 106 are retained by the optical fiber retaining means 118 as shown in FIG. 1. In this way, it is possible to avoid a trouble such as entanglement among the optical fibers 110.

Moreover, after housing and aligning the plurality of ferrules 106 in the housing positions in the respective housing holes 104, the holder heating unit 114 is moved upward by use of the holder heating unit moving means 116, whereby the upper face of the holder heating unit 114 (the holder contact surface 128) and the lower face of the holder 102 (the holder heating unit contact surface 122) are allowed to contact each other. In this state, the power source of the holder heating unit 114 is turned on, so that the holder 102 and the ferrules 106 are heated for a predetermined time period (about 30 minutes, for example) at a predetermined temperature (about 85° C., for example). In this way, the thermosetting adhesive agent existing between the ferrules 106 and the optical fibers 110 are hardened so that the ferrules 106 and the optical fibers 110 are adhered integrally.

After adhesion, the power source of the holder heating unit 114 is turned off, and the holder heating unit 114 is moved downward to be separated from the holder 102 by use of the holder heating unit moving means 116. Subsequently, the ferrules 106 which are housed and aligned in the housing holes 104, and the optical fibers 110 retained by the optical fiber retaining means 118 are taken away, and then the next ferrules 106 and others for adhesion are housed and aligned in the housing holes 104 in the same way.

Adhesion of the ferrules 106 and the optical fibers 110 is continuously performed by repeating the above-described operation.

SUMMARY OF THE INVENTION

Incidentally, the ferrule heating apparatus 100 has the constitution in which the holder heating unit 114 is disposed above the temperature control unit 126 of the heater, and the holder 102 is disposed above the holder heating unit 114. Accordingly, a distance from an upper face SF1 of the work table, on which the ferrule heating apparatus 100 is disposed, to the holder 102 accounts for 250 mm, for example. Therefore, the height of the holder 102 from the upper face SF1 of the work table is thoroughly high.

Moreover, assuming that the ferrule heating apparatus 100 is disposed on the upper face of the work table having the height of about 700 mm, for example, and that an operator performs the operation of housing the ferrules to be heated into the holder 102 and taking out the ferrules, which are heated and integrally fixed to the optical fibers, from the holder 102 while the operator sits on a chair adjusted for the work table, then the operator has to work while lifting his arms and hands high because the locating position of the holder 102 is located high. Accordingly, the operation becomes hard and causes fatigue.

It is also conceivable to increase the height of the position of the chair where the operator sits on, or alternatively, to reduce the height of the upper face of the work table. However, such arrangements will require special designs for the chair and the work table.

The present invention has been made in consideration of the foregoing problem. An object of the present invention is to provide a ferrule heating apparatus for heating a ferrule, where an optical fiber is inserted therein, so as to fix the both members integrally to each other by adhesion using a thermosetting adhesive agent, which facilitates an operator to locate the ferrule to be heated into a holder of the ferrule heating apparatus and to take out the heated ferrule from the holder while the operator sits on a chair arranged for the work table.

According to a first technical aspect of the present invention, provided is a ferrule heating apparatus configured to allow one end side of an optical fiber to be inserted into an optical fiber insertion through hole being provided on a ferrule, and to heat the ferrule while containing a thermosetting adhesive agent between an inner peripheral surface of the optical fiber insertion through hole and the optical fiber, and thereby to adhere the optical fiber and the ferrule together. Here, the ferrule heating apparatus includes a thermally conductive holder having a plurality of ferrule housing portions for housing and aligning the ferrules, a holder heating unit for supporting and heating the holder, and a control unit for supplying electric power to the holder heating unit and for controlling a heating temperature of the holder heating unit. In the ferrule heating apparatus, the control unit is disposed separately from the holder heating unit.

According to a second technical aspect of the present invention, provided is a method of adhering an optical fiber and a ferrule applicable to a plurality of ferrules and a plurality of optical fibers, in which one end side of each of the optical fibers is inserted into an optical fiber insertion through hole provided on each of the ferrules. Here, the method includes injecting a thermosetting adhesive agent between an inner peripheral surface of each of the optical fiber insertion through holes and each of the optical fibers, and heating the ferrules for a predetermined time period by inclining the ferrules such that opposite ends to ends where the optical fibers extends out of the ferrules are placed lower.

BRIEF DESCRIPTION OF THE DRAWINGS

FIG. 4 is a front view showing a schematic constitution of a ferrule heating apparatus according to a first embodiment of the present invention.

FIG. 8 is a plan view showing the constitution of the ferrule heating apparatus excluding a temperature control unit.

DESCRIPTION OF THE PREFERRED EMBODIMENTS

First Embodiment

Figure 5A:
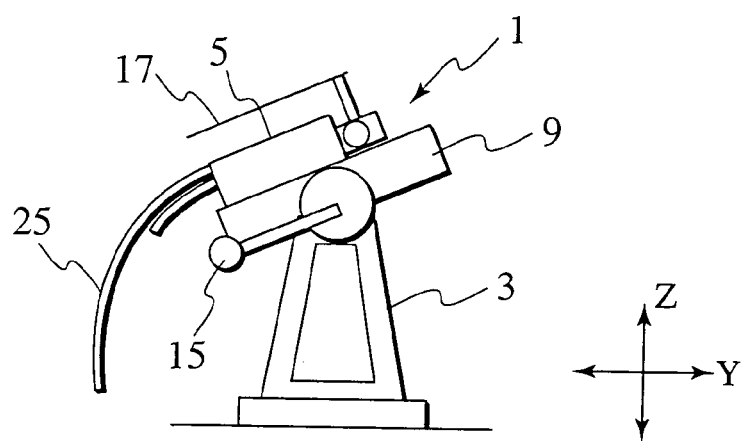
FIGS. 5A to 5C are diagrams from a viewpoint indicated with the arrow V in FIG. 4, which are side views showing the schematic constitution of the ferrule heating apparatus.
Figure 5B:
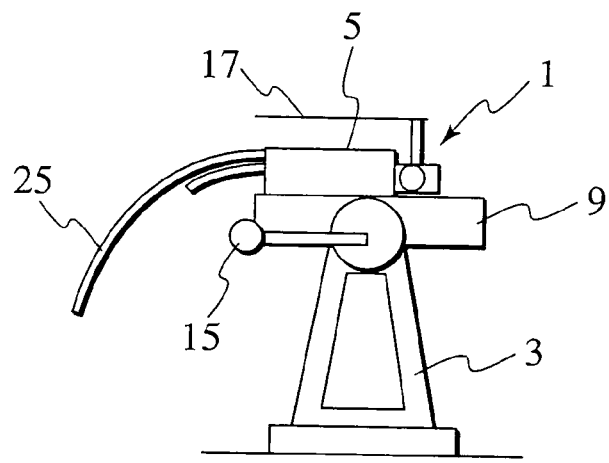
Figure 5C:
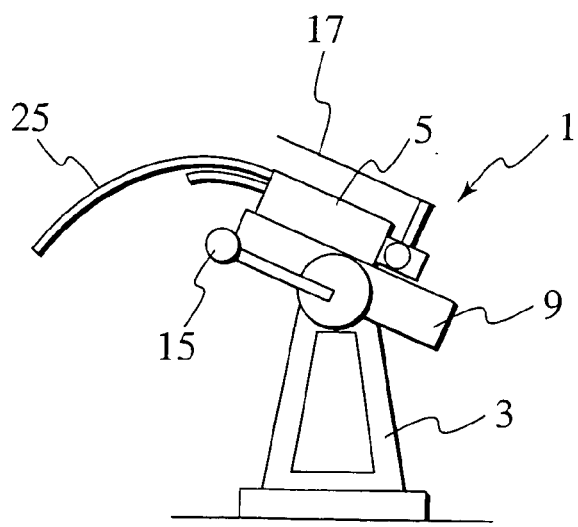

FIG. 4 is a front view showing a schematic constitution of a ferrule heating apparatus 1 according to a first embodiment of the present invention. FIGS. 5A to 5C are diagrams from a viewpoint indicated with the arrow V in FIG. 4, which are side views showing the schematic constitution of the ferrule heating apparatus. Here, each of FIGS. 5A to 5C shows a holder which is capable of housing a ferrule as desired in either a horizontal or an inclined state.

Figure 1:
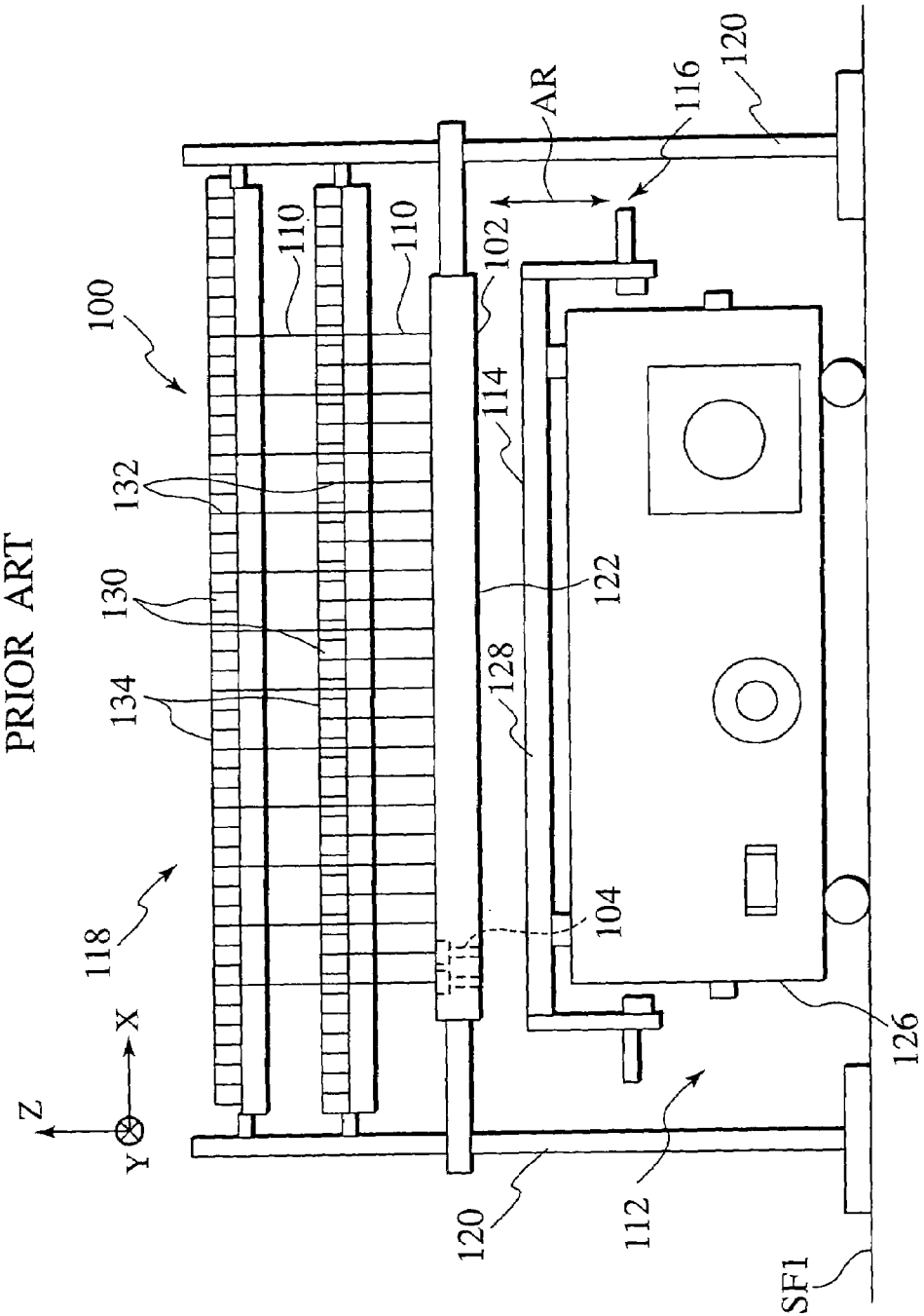
FIG. 1 is a front view showing a schematic constitution of a previously disclosed ferrule heating apparatus.
Figure 2A:
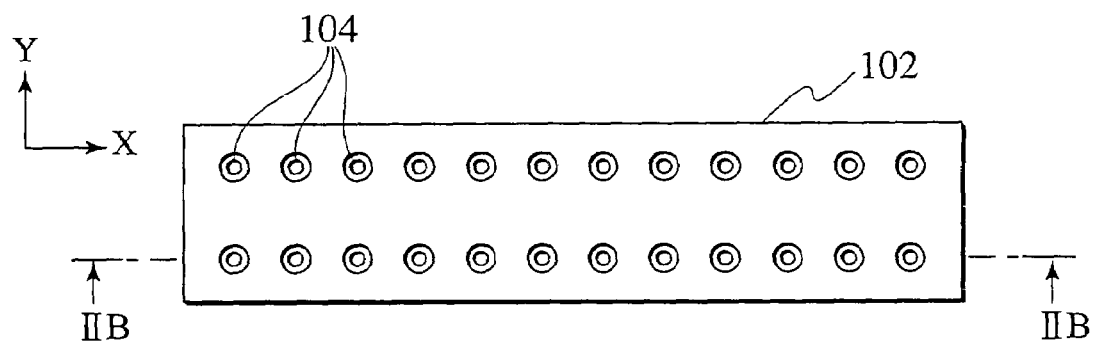
FIGS. 2A and 2B are views showing a holder which is provided on the previously disclosed ferrule heating device, and which houses a ferrule to be heated while allowing an optical fiber to be inserted therein.
Figure 2B:
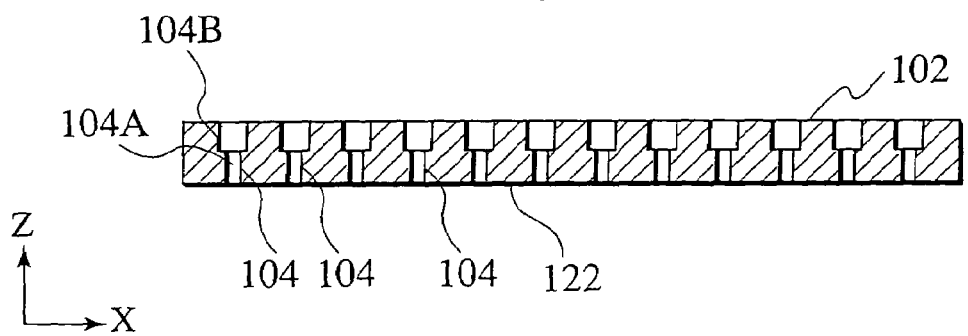

As similar to the ferrule heating apparatus 100 shown in FIG. 1, the ferrule heating apparatus 1 is a ferrule heating apparatus for adhering optical fibers and ferrules by heating the ferrules. Here, one end side of each optical fiber is inserted into an optical fiber insertion through hole provided on each ferrule, and a thermosetting adhesive agent exists between an inner peripheral surface of the optical fiber insertion through hole and the optical fiber. The ferrule heating apparatus 1 includes a holder 5 formed of thermally conductive members, which has a plurality of ferrule housing portions which are capable of housing and aligning the ferrules into housing positions as desired.

In the ferrule heating apparatus 1, however, a holder heating unit 9 for heating the holder 5 and a temperature control unit 11 for controlling the temperature of the holder heating unit 9 are located mutually separately, and the holder heating unit 9 and the temperature control unit 11 are electrically connected to each other by at least a flexible and relatively long electric cable 13 (a cable for supplying electric power to increase the temperature of the holder heating unit 9).

Meanwhile, regarding the ferrule hating apparatus 1, the holder heating unit 9 is supported by a base frame 3 of the ferrule heating apparatus. Moreover, the holder heating unit 9 is not provided above the temperature control unit 11 to suppress the height from a bottom part of the base frame 3 to the holder heating unit 9. Instead, the temperature control unit 11 is provided beside the holder heating unit 9 separately from the holder heating unit.

Furthermore, in the ferrule heating apparatus 1, the holder 5 is supported by the holder heating unit 9 and is thereby integrally provided. Accordingly, the holder 5 and the holder heating unit 9 are arranged as capable of inclining against a horizontal plane.

In other words, the holder 5 is configured to be capable of inclining from a state where the holder 5 capable of freely housing the ferrules is set horizontal as shown in FIG. 5B, to a position where the holder 5 is inclined so that an operator side becomes lower as shown in FIG. 5A, or to a position where the holder 5 is inclined so that the operator side becomes higher as shown in FIG. 5C.

In the ferule heating apparatus 1, an operator inclines the holder 5 and the like by use of a handle 15 provided on one end side of the holder heating unit 9, for example. Moreover, the ferrule heating apparatus 1 is provided with a heat insulating cover 17, which is capable of maintaining states of covering and not covering an upper part of the holder 5.

As similar to the temperature control unit 126 of the ferrule heating apparatus 100 shown in FIG. 1, the temperature control unit 11 of the ferrule heating apparatus 1 includes a controller 18 for controlling the temperature of the holder heating unit 9, a timer 19 for regulating heating time, and a power source switch 21 for turning on and off a power source of the temperature control unit 11.

To set the temperature of the holder 5 accurately, it is also possible to provide a temperature sensor (not shown) for detecting the temperature of the holder 5 in the vicinity of the ferrule housing portions of the holder 5 or at the holder heating unit 9, for example, and to provide a sensor line (a signal line) for transmitting temperature information detected by the temperature sensor to the controller 18 of the temperature control unit 11 together with or apart from the electric cable 13, so that the temperature of the holder heating unit 9 is controlled based on the temperature information received from the temperature sensor via the sensor line and on information set in the controller 18.

Meanwhile, it is also possible to configure the holder 5 as detachable from the holder heating unit 9, so that the holder 5 can be replaced by holders of other types in accordance with aspects of the ferrules to be housed in the holder 5 or aspects of connectors for optically connecting the optical fibers (end faces of the optical fibers) supported by these ferrules.

Description will be made further in detail regarding the ferrule heating apparatus 1. Here, in this embodiment, description will be made based on the assumption that the ferrule heating apparatus 1 performs fixation by thermal adhesion between a mechanically transferable connector (MT connector) and an optical fiber inserted into a through hole of this MT connector via a thermosetting adhesive agent.

Figure 6:
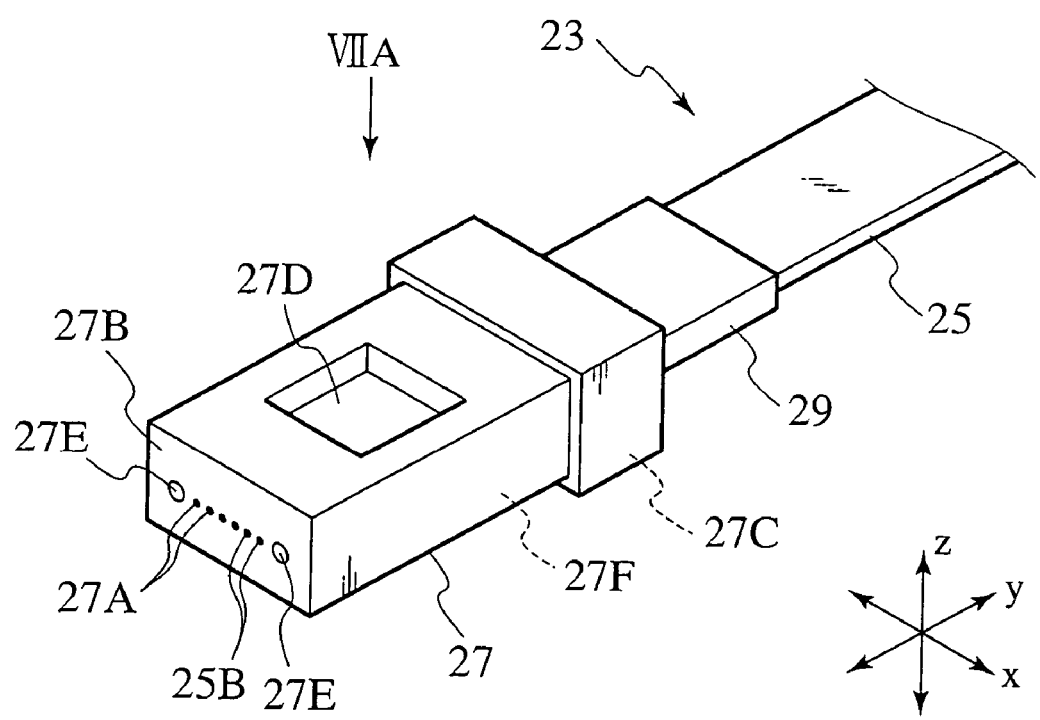
FIG. 6 is a perspective view showing a constitution of an MT connector.
Figure 7A:
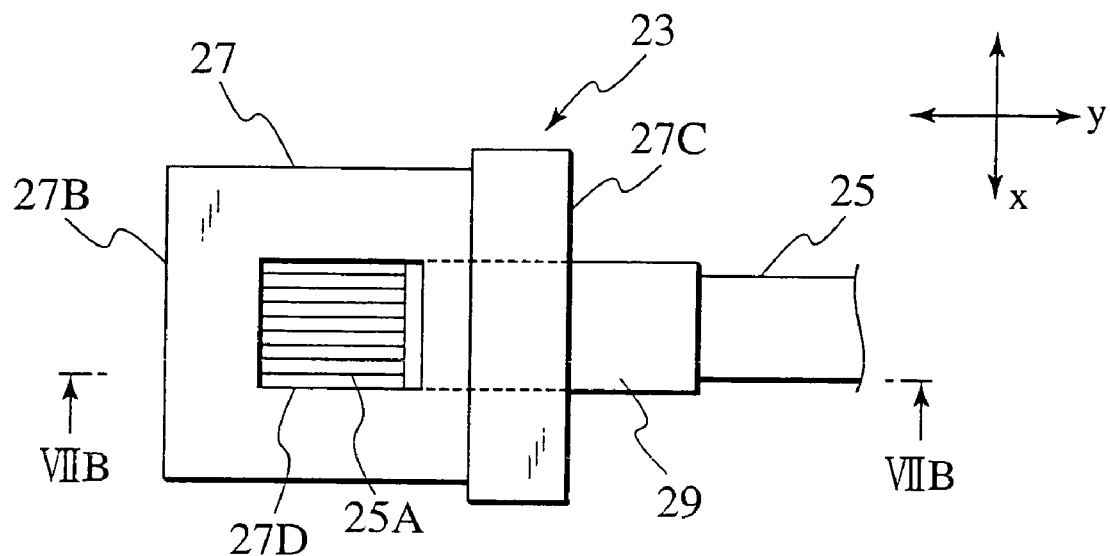
FIG. 7A is a plan view of the MT connector.
Figure 7B:
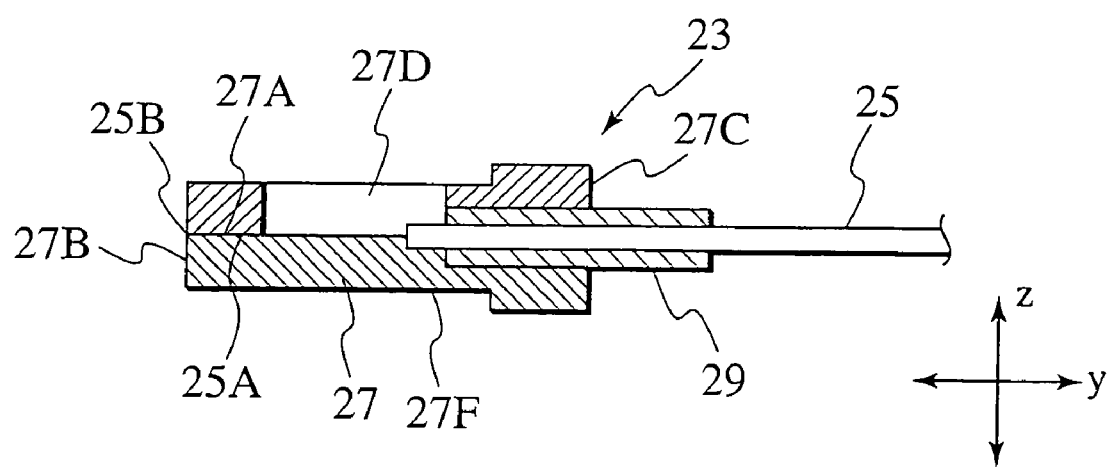
FIG. 7B is a cross-sectional view of the MT connector.

Description will be firstly made regarding the MT connector. FIG. 6 is a perspective view showing a constitution of an MT connector 23. FIG. 7A is a plan view of the MT connector 23 from a viewpoint indicated with the arrow VIIA in FIG. 6, and FIG. 7B is a cross-sectional view of the MT connector 23 which is taken along the VIIB—VIIB line in FIG. 7A.

The MT connector 23 is a connector to be used when multicore optical fibers 25 are integrally connected to each other. The MT connector 23 includes a ferrule 27 for integrally adhering and supporting one end side of the multicore optical fiber 25, which is formed into a tape shape by aligning a plurality of optical fibers. A boot 29 made of an elastic body such as rubber covers and supports the multicore optical fiber 25 together with the ferrule 27 on an extending side of the multicore optical fiber 25 so as to reinforce the multicore optical fiber 25.

The ferrule 27 of the MT connector 23 is formed into a rectangular solid shape, and a plurality of optical fiber through holes 27A for allowing the one end side of the multicore optical fiber 25 having respectively exposed bare optical fibers 25A to be inserted therein for location and retention are aligned in the width direction (the x-direction) of the ferrule 27 and are formed in the longitudinal direction (the y-direction) of the ferrule 27.

The respective optical fiber through holes 27 may be formed in the event of molding the ferrule 27, or may be formed by stacking (sandwiching) precisely-processed members, each of which is processed in high precision to form a plurality of locating grooves (such as V-shaped grooves) for aligning the respective bare optical fibers 25A on one face, such that the aligning grooves of the members face one another.

Moreover, an adhesive agent injection hole 27D is provided on one end side in the thickness direction (the z-direction) of the ferrule 27, which is used upon injecting the thermosetting adhesive agent for adhering the respective bare optical fibers 25A, which are inserted into the respective optical fiber through holes 27A of the ferrule 27, to the ferrule 27. Then, the one end side of the multicore optical fiber 25 where the respective bare optical fibers 25A are exposed is inserted into the through holes 27A, and the inserted respective bare optical fibers 25A are exposed on one end 27B side in the longitudinal direction of the ferrule 27.

On the other end 27C side opposing the one end face 27B of the ferrule 27, one end side of the boot 29, which covers and supports the extending multicore optical fiber 25, is engaged with the ferrule 27 and is thereby provided integrally with the ferrule 27.

In this state, the ferrule 27 is set on (aligned in the housing position of) the holder 5 of the ferrule heating apparatus 1. Then, the thermosetting adhesive agent is injected from the adhesive agent injection hole 27D. Thereafter, the ferrule 27 thus set is heated for a predetermined time period at a predetermined temperature, and the respective bare optical fibers 25A of the multicore optical fiber 25 are integrally fixed to the ferrule 27. Here, the thermosetting adhesive agent injected from the adhesive agent injection hole 27D as described above penetrate spaces between the optical fiber through holes 27A and the bare optical fibers 25A.

After heating, the ferrule 27 (the MT connector 23) is removed, together with the multicore optical fiber adhered and supported with the ferrule 27, from the ferrule heating apparatus 1. Then, the one end face 27B of the ferrule 27 is ground together with faces 25B of the bare optical fibers 25A of the multicore optical fiber 25 by use of a grinder.

Furthermore, two MT connectors 23 each retaining the one end face of the multicore optical fiber 25 are aligned and connected together by use of aligning holes 27E, which are formed on both sides of the respective through holes 27A provided in a row in the width direction of the ferrule 27 on the one end face 27B of the ferrule 27 as shown in FIG. 6. As a result, the optical fibers retained by the respective MT connectors 23 are optically connected each other.

Note that, hereinafter, the coordinate system (X, Y, Z) is described as a static coordinate system and the other coordinate system (x, y, z) a coordinate system which is fixed to the holder heating apparatus.

Ferrule Heating Apparatus

Figure 9:
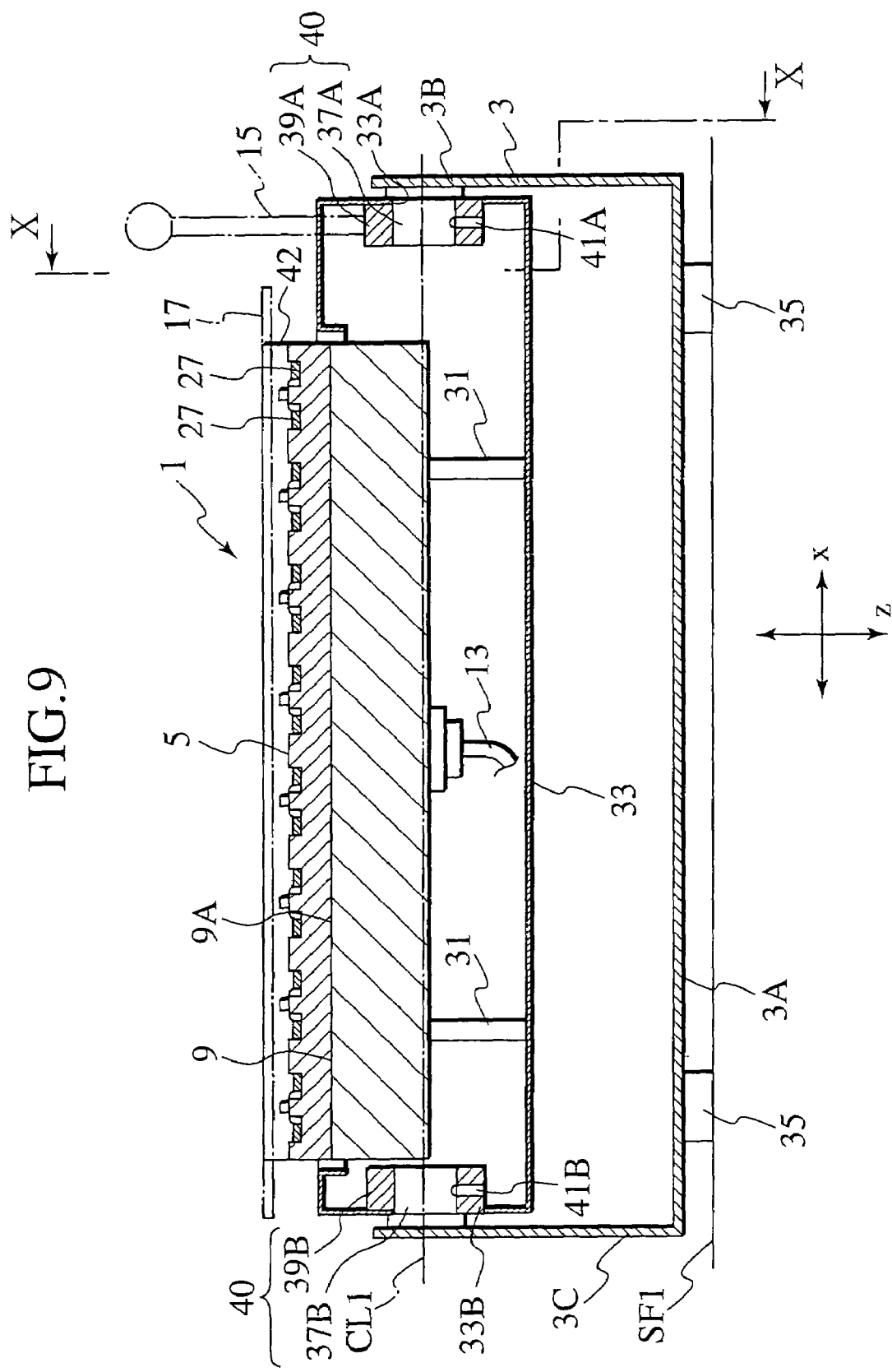
FIG. 9 is a cross-sectional view taken along the IX—IX line in FIG. 8.
Figure 10:
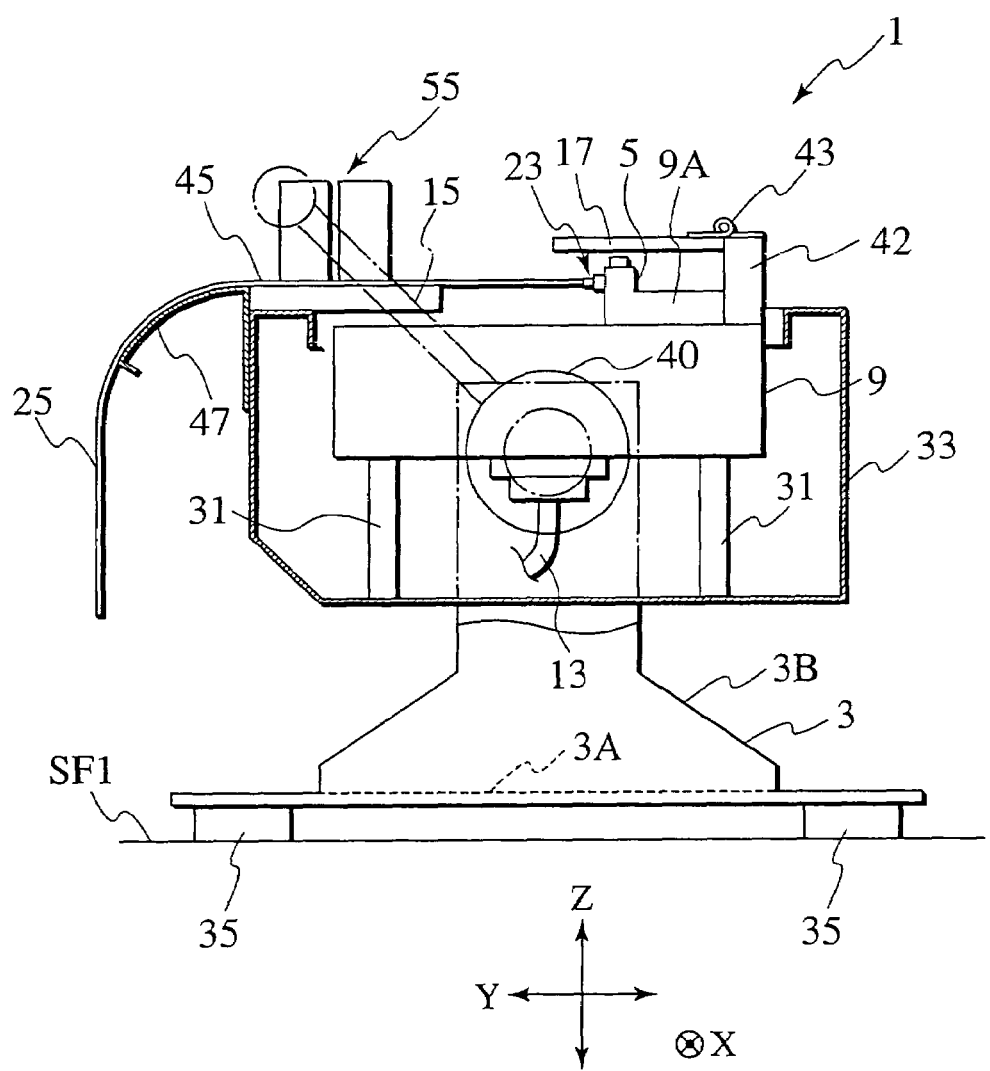
FIG. 10 is a cross-sectional view taken along the X—X line in FIG. 9.

FIG. 8 is a plan view showing the constitution of the ferrule heating apparatus 1 excluding the temperature controller 11 (while including a portion for heating the MT connector 23). FIG. 9 is a cross-sectional view taken along the IX—IX line in FIG. 8, and FIG. 10 is a cross-sectional view taken along the X—X line in FIG. 9. An upper face 9A of the holder heating unit 9 is displayed approximately horizontally in FIG. 8 to FIG. 10. The X direction and the Y direction in FIG. 10 are horizontal directions in which the X direction and the Y direction are orthogonal to each other, and the Z direction therein is a vertical direction.

The ferrule heating apparatus 1 includes the holder heating unit 9 in the rectangular solid shape. As shown in FIG. 9 and FIG. 10, the power source cable 13 extends out of a lower face of this holder heating unit 9, and the power source cable 13 thus extending is connected to the temperature control unit 11 shown in FIG. 4. The sensor line (the signal line) for transmitting the temperature information detected by the temperature sensor (not shown) for detecting the temperature of the holder 5 to the controller of the temperature control unit 11 is also provided together with the electric cable 13. The sensor line is also connected to the temperature control unit 11.

Side-face sides and the lower face side of the holder heating unit 9 are covered with a cover 33, which is integrally fixed to the holder heating unit 9 by cover retaining members 31. Therefore, the operator cannot easily touch the side faces and the lower face of the holder heating unit 9 with a hand.

The holder heating unit 9 and the cover 33 are not in a direct contact with each other. The cover 33 is provided with an interval with the holder heating unit 9, that is, there is a space between the holder heating unit 9 and the cover 33. Accordingly, the heat radiated from the holder heating unit 9 does not easily transfer to the cover 33. Therefore, even if the holder heating unit 9 reaches a high temperature, the cover 33 does not reach a high temperature as compared to the holder heating unit 9.

As shown in FIG. 9 and FIG. 10, the power source cable 13 and the signal line of the temperature sensor extending out of the lower face of the holder heating unit 9 penetrate the cover 33 and extend out as shown in FIG. 8, and are connected to the temperature control unit 11 shown in FIG. 4.

The cover 33 is placed on the base frame 3 by use of an articulation portion 40, so that the cover 33 can rotate pivotally around a theoretical rotation axis CL1 (see FIG. 9) which extends in the X direction at an intermediate part thereof. As shown in FIG. 9, the base frame 3 includes a board portion 3A extending long in the X direction, and respective upright board portions 3B and 3C provided on both end sides of this base portion 3A so as to extend upward in the Z direction. The holder heating unit 9 and the cover 33 are provided between the respective upright positions 3B and 3C above the base portion 3A.

A plurality of pedestals 35 made of a material having elasticity and a large friction coefficient, such as hard rubber, are provided on a lower face of the base portion 3A of the base frame 3. The respective pedestals 35 contact an upper face SF1 of a work table, whereby the holder heating unit 9 and other parts of the ferrule heating apparatus 1 are placed on the work table.

Inside the respective upright portions 3B and 3C of the base frame 3, a rotating shaft member 37A and a rotating shaft member 37B are provided integrally for supporting the cover 33 as rotatable pivotally around the theoretical rotation axis CL1, which function as the articulation portion 40 (see FIG. 9).

Meanwhile, a through hole 33A and a through hole 33B are provided on respective end portions in the X(x) direction of the cover 33. The respective rotating shaft members 37A and 37B penetrate the respective through holes 33A and 33B and extend into the cover 33.

Bearing members 39A and 39B are respective fitted the respective rotating shaft members 37A and 37B which extend into the cover 33, so as to be rotatable around the rotating shaft members 37A and 37B. These respective bearing members 39A and 39B are integrally provided to the inside of the both end portions of the cover 33.

A ball plunger 41A and a ball plunger 41B are respectively provided on the respective bearing members 39A and 39B for facilitating location of the cover in an index position upon rotating the cover 33 by allowing balls on tips to be engaged with the respective rotating shaft members 37A and 37B, and for imparting appropriate rotational resistance to rotation.

In the outer periphery of the bearing member 39A, a lever 15 extending toward the outer periphery of the bearing member 39A is integrally fixed. Accordingly, the operator can rotate the cover 33 by use of the lever 15 so as to incline the holder heating unit 9 and other parts relative to the horizontal plane as shown in FIG. 5A or FIG. 5C.

Meanwhile, the holder 5 for retaining and housing the ferrules 27 of the MT connectors 23 is provided long in the X direction on the upper face 9A of the holder heating unit 9. This holder 5 is designed to house a plurality of MT connectors 23 in a row in the X direction, so that the multicore optical fibers 25 extending out of the housed MT connectors 23 extend in the Y direction toward the operator above the upper face 9A of the holder heating unit 9.

Constitution of Holder

Figure 11:
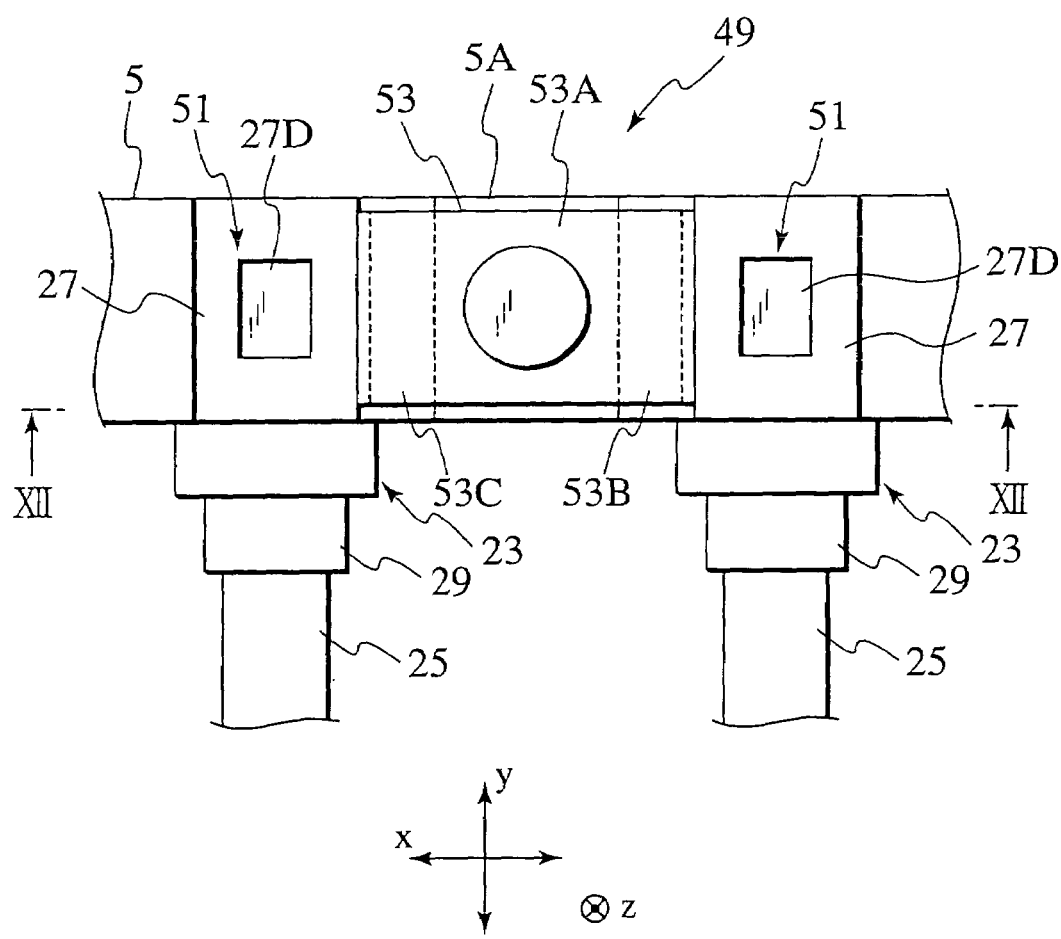
FIG. 11 is an enlarged view of the XI portion in FIG. 8.
Figure 12:
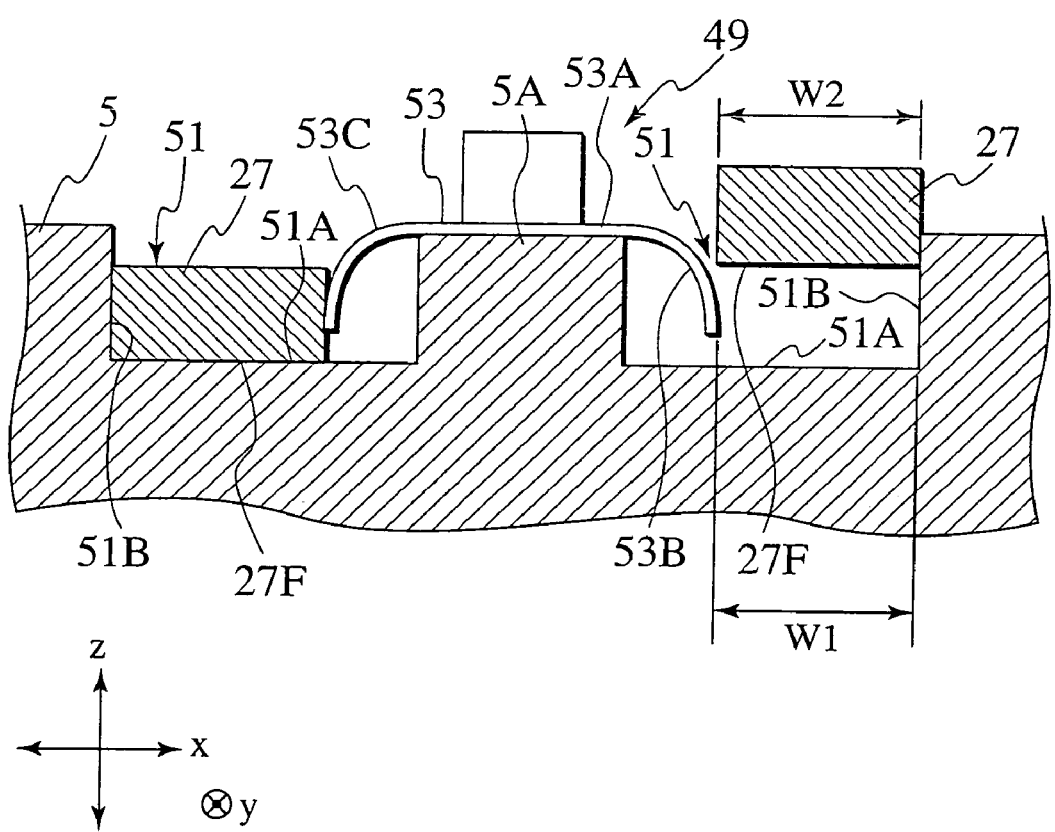
FIG. 12 is a cross-sectional view taken along the XII—XII line in FIG. 11.

FIG. 11 is an enlarged view of the XI portion in FIG. 8, and FIG. 12 is a cross-sectional view taken along the XII—XII line in FIG. 11. FIG. 11 and FIG. 12 are enlarged views showing a state of fitting the MT connector 23 in the ferrule heating apparatus 1.

The holder 5 includes a plurality of rectangular ferrule aligning grooves 51 which are an example of the ferrule housing potion, and respective bottom portions of these ferrule aligning grooves 51 constitutes ferrule heating surface 51A for heating the ferrule 27 of the MT connector 23. One side face of the ferrule aligning groove 51 which intersects approximately perpendicularly with this ferrule heating surface 51A constitutes a position regulating portion 51B for aligning this ferrule 27 together with the ferrule heating surface 51A when the ferrule 27 is housed in the ferrule aligning groove 51 of the holder 5.

As shown in FIG. 5B and FIG. 8, the respective ferrule aligning grooves 51 extend in the y-direction and are aligned in the x-direction. Accordingly, the ferrule heating surfaces 51A of the ferrule aligning grooves 51 are set horizontal in the state where the upper face 9A of the holder heating unit 9 is set approximately horizontal.

Regarding the ferrule 27 of the MT connector 23, a heated surface (a face in the thickness direction of the ferrule 27 opposite to the face on which the adhesive agent injection hold 27D is provided) 27E of the ferrule 27 contacts the ferrule heating surface 51A of the ferrule aligning groove 51 by use of a thrusting mechanism 49 made of an elastic member. One side face in the width direction of the ferrule 27 contacts the location regulating portion 51B and is thereby aligned to and retained by the holder 5.

In other words, the thrusting mechanism 49 is a mechanism for maintaining plane contact between the heated surface 27F of the ferrule 27 and the ferrule heating surface 51A by energizing the ferrule 27 by pressure against the ferrule position regulating portion 51B.

An elastic member 53 constituting the thrusting mechanism 49 is formed of a board spring member, for example. The elastic member 53 includes a planar portion 53A, and respective curved portions 53B and 53C which are formed on both sides of this planar portion 53A. The planer portion 53A is integrally fixed to an upper face 5A of the holder 5 existing between the ferrule aligning groove 51 and an adjacent ferrule locating hole 51 by use of a fastener such as a bolt. Meanwhile, the respective curved portions 53B and 53C extend into the respective ferrule aligning grooves 51.

In this state, each of the curved portions 53B and 53C is formed by a curved face such as an arc shape, which is curved such that a tip side thereof approaches the ferrule heating surface 51A more as the curved portion approaches the ferrule position regulating portion 51B.

In this embodiment, the respective ferrule position regulating portions 51B of the respective ferrule aligning grooves 51 provided on the both sides of the upper face 5A of the holder 5 are disposed in symmetrical positions with respect to a central portion of the upper face 5A.

Moreover, a distance W1 between each of the curved portions 53B and 53C and the respective ferrule position regulating portions 51B opposing thereto is made slightly shorter than a width dimension W2 of the ferrule 27 (see FIG. 12).

When the ferrule 27 is housed into the ferrule aligning groove 51, for example, the heated surface 27F of the ferrule 27 is energized by the curved potion 53B and thereby contacts the heating surface 51A of the ferrule locating groove 51, and the one side face in the width direction of the ferrule 27 contacts the position regulating portion 51B of the ferrule aligning groove 51, whereby the ferrule 27 is aligned and retained inside the ferrule aligning groove 51.

Note that an operation of housing the ferrule 27 into the ferrule aligning groove 51 and an operation of taking the ferrule housed in the ferrule aligning groove 51 away from the ferrule aligning groove 51 can be performed by grasping and moving the ferrule 27 without touching the thrusting mechanism 49. Accordingly, the operator can perform such operations efficiently with one hand.

Moreover, above the holder 5 provided on the upper face 9A of the holder heating unit 9, the board-shaped heat insulating cover 17 is provided separately from the holder 5. The heat insulating cover 17 extends long in the x-direction for covering over the holder 5 and part of the upper face 9A adjacent thereto. Provision of the heat insulating cover 17 can reduce dissipation of heat quantity from the holder to the outside of the heat insulating cover 17 by a heat insulation and reflection effect of the heat insulating cover 17 and a heat insulation effect of a space between the heat insulating cover 17 and the holder 5. Accordingly, it is possible to heat the ferrules 27 of the respective MT connectors 23 housed in the holder 5 efficiently. And, it is also possible to eliminate the risk that the operator suffers burns by accidentally touching the upper face 9A of the holder heating unit 9

On the opposite side to the side of extension of the multicore optical fibers 25 of the upper face 9A, a heat insulating cover supporting member 42 is provided so as to extend long in the x-direction, and one end side in the y-direction of the heat insulating cover 17 is supported by the heat insulating cover supporting member 42 by use of a hinge 43.

When the operator rotates the heat insulating cover 17 upward from the state where the heat insulating cover 17 covers over the holder 5 as shown in FIG. 10, the heat insulating covers does not cover over the holder 5 any more. In this state, the operator can take the MT connectors 23 away from the holder 5 or fit the MT connectors 23 to the holder 5.

On a side of an upper face of the cover 33 where the multicore optical fibers 25 extends in the Y(y) direction (the operator side), a multicore optical fiber placing member 45 for placing and supporting the extending multicore optical fibers 25 is integrally provided. Moreover, a multicore optical fiber supporting cover 47, which is capable of supporting the multicore optical fibers 25 further extending in the Y direction from the multicore optical fiber placing member 45 and of allowing the multicore optical fibers 25 to extend downward in the Z direction, is provided on one end side (one end side opposite to the holder 5) in the Y direction of the multicore optical fiber placing member 45 continuously with the multicore optical fiber placing member 45.

The multicore optical fiber supporting cover 47 is made of an arc-shaped board member, which is gradually curved downward in the Z direction as distant from the multicore optical fiber placing member 45.

In the state where the ferrule 27, in which the one end side of the multicore optical fiber 25 is inserted, is housed in the holder 5 of the ferrule heating apparatus 1, the multicore optical fiber 25 extending from the ferrule 27 moves away from the holder heating unit 9 in a space between the holder 5 and the multicore optical fiber placing member 45 and extends above the holder heating unit 9 horizontally in the direction of the multicore optical fiber placing member 45. In places of the multicore optical fiber placing member 45 and of the multicore optical fiber supporting cover 47, the multicore optical fiber 25 contacts and extends along the multicore optical fiber placing member 45 and the multicore optical fiber supporting cover 47.

In addition, the multicore optical fiber placing member 45 and the multicore optical fiber supporting cover 47 are fixed to the cover 33, which does not contact the holder heating unit 9 directly. Accordingly, if the holder heating unit 9 generates the heat for heating the ferrules 27, the multicore optical fiber placing member 45 or the multicore optical fiber supporting cover 47 does not reach a high temperature.

Therefore, even if the holder heating unit 9 generates the heat, the multicore optical fibers 25 extending from the ferrules 27 are hardly heated. Accordingly, coverings and the like of the multicore optical fibers 25 do not suffer adverse effects by the heat.

The multicore optical fibers 25 further extending out of the multicore optical fiber supporting cover 47 hang downward in the Z direction as shown in FIG. 10. Since the multicore optical fiber supporting cover 47 is curved in the arc shape and thereby guiding the multicore optical fibers 25, the direction of extension of the multicore optical fibers 25 gradually changes from the horizontal direction to the perpendicular direction. In this way, it is possible to avoid the multicore optical fibers 25 from being sharply bent and broken.

Multicore optical fiber fixing means 55 for fixing the multicore optical fibers 25, which extend from the ferrules 27 housed in the holder 5, in the event of heating the ferrules 27 is provided on an upper face of the multicore optical fiber placing member 45.

Multicore Optical Fiber Fixing Means

Figure 13:
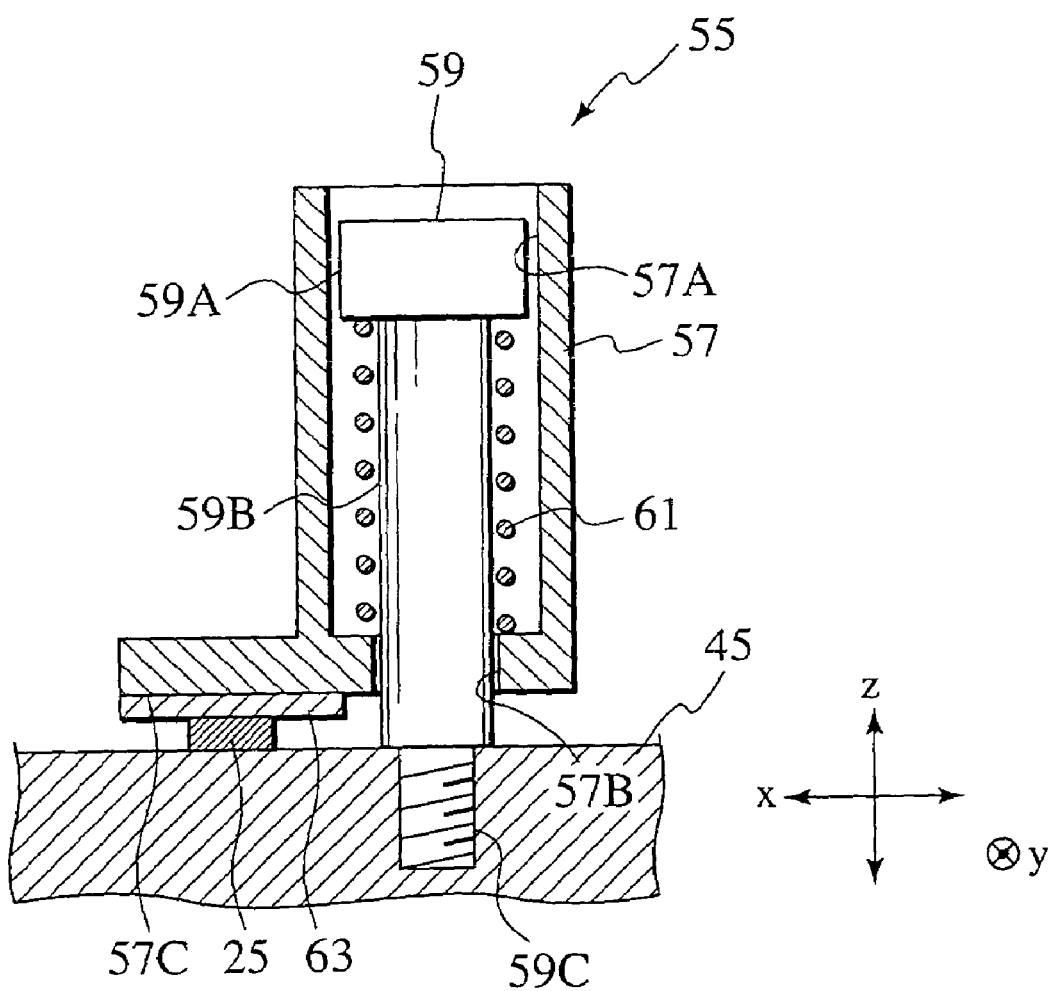
FIG. 13 is a cross-sectional view showing a constitution of multicore optical fiber fixing means, which shows a cross section taken along the XIII—XIII line in FIG. 8.

FIG. 13 is a cross-sectional view showing a constitution of the multicore optical fiber fixing means 55, which shows a cross section taken along the XIII—XIII line in FIG. 8. The multicore optical fiber fixing means 55 includes a supporting member 59 standing up from the upper face of the multicore optical fiber placing member 45 and thereby being integrally provided to the multicore optical fiber placing member 45, a thrusting member 57 which is slidably engaged with this supporting member 59 so as to be freely movable in the perpendicular direction (the z-direction) to the upper face of the multicore optical fiber placing member 45, and a compression spring 61 for energizing the thrusting member 57 downward in the z-direction to retain the multicore optical fiber 25.

The supporting member 59 includes a first guiding portion 59A of a cylindrical shape, a second guiding portion 59B being provided on a lower end side of the first guiding portion 59A and formed into a cylindrical shape having an outline smaller than the first guiding portion 59A, and a screw portion 59C being provided on a lower end side of this second guiding portion 59B for fixing the supporting member 59 to the multicore optical fiber placing member 45. Here, the central axis of the first guiding portion 59A and the central axis of the second guiding portion 59B coincide with each other.

The thrusting member 57 includes a first guiding portion 57A of a tubular shape, which has an inside diameter slightly larger than the outline of the first guiding portion 59A of the supporting member 59 and is slidably engaged with the first guiding portion 59A, a second guiding portion 57B of a tubular shape provided on a lower end side of this first guiding portion 57A, which has an inside diameter slightly larger than the outline of the second guiding portion 59B of the supporting member 59 and is slidably engaged with the second guiding portion 59B, and a thrusting portion 57C provided on a lower end side of the thrusting member 57 so as to protrude outward from a side face of the thrusting member 57, which is formed into a planar shape approximately parallel to the upper face of the multicore optical fiber placing member 45.

The central axis of the first guiding portion 57A and the central axis of the second guiding portion 57B approximately coincide with each other. Moreover, the thrusting member 57C is a thrusting member for pressing the multicore optical fiber 25 against the multicore optical fiber placing member 45.

The compression spring 61 is provided in a space between the first guiding portion 59A and an upper face of the second guiding portion 57B and in the outer periphery of second guiding member 59B. Moreover, the thrusting member 57 is energized downward in the z-direction by this compression spring 61, then the thrusting portion 57C of the thrusting member 57 is energized toward the direction of the multicore optical fiber placing member 45 and thereby thrusts the multicore optical fiber 25 against the multicore optical fiber placing member 45 for retention.

An elastic member 63 made of a material having a large friction coefficient, such as hard rubber, is adhered to the thrusting portion 57C of the thrusting member 57 for increasing power for retaining the multicore optical fiber 25.

The plurality of ferrules 27 are housed in the holder 5 by retaining the multicore optical fibers 25 extending from the ferrules 27 housed in the holder 5 by use of the multicore optical fiber fixing means 55 which is movable in the z-direction. Accordingly, even if the plurality of multicore optical fibers 25 extend out of the holder 5, it is possible to prevent the respective multicore optical fibers 25 from being entangled with one another. Moreover, it is also possible to eliminate slacks of the multicore optical fibers 25 between the holder 5 and the multicore optical fiber placing member 45 and to prevent adverse effects to the multicore optical fibers 25 by being heated upon contact with the holder heating unit 9.

Adhering and Fixing Operation by Ferrule Heating Apparatus

The covering on one end side of the multicore optical fiber 25 is removed to expose the bare optical fibers 25A, and portions of the exposed bare optical fibers 25A are inserted into the through holes 27A of the ferrule of the MT connector 23. In this event, the multicore optical fiber (the multicore optical fiber without removing the covering) 25 in the vicinity of the portion where the bare optical fibers 25A are exposed is inserted into the ferrule 27 together with the boot 29 covering the multicore optical fiber 25.

In this way, the ferrule 27 in which the multicore fiber 25 is inserted is housed into the holder 5 in the state where the adhesive agent injection hole 27D of this ferrule 27 is placed upward, whereby the MT connector 23 is aligned and retained. Simultaneously, the multicore optical fiber 25 extending from the ferrule 27 housed in the holder 5 is retained by the multicore optical fiber fixing means 55 to avoid a slack of the multicore optical fiber 25, and the multicore optical fiber 25 further extending outward is guided so as to hand downward by use of the multicore optical fiber supporting cover 47. When this operation takes place, the operation is easily executed if the holder heating unit 9 is inclined so as to set the operator side lower as shown in FIG. 5C Subsequently, the thermosetting adhesive agent is injected from the adhesive agent injection hole 27D for adhering and fixing the portion of the multicore optical fibers 25 where the bare optical fibers are exposed and the through holes 27A of the ferrules 27 to one another.

When the thermosetting adhesive agent is injected, the holder 5 and the holder heating unit 9 are set horizontal as shown in FIG. 5B, such that the ferrules 27 of the MT connectors 23 are set horizontal (such that the through holes 27A of the ferrule 27 extend in the horizontal direction by setting the heating surfaces 51A of the ferrule aligning grooves 51 horizontal).

It is also possible that the thermosetting adhesive agent is injected into the ferrule 27 in which the multicore optical fiber 25 is inserted, and then the ferrule 27 is housed into the holder 5. In this case, it is preferable to set the holder 5 and the holder heating unit 9 horizontal as shown in FIG. 5B, in order to prevent the injected thermosetting adhesive agent from being spilled out.

Subsequently, in order to prevent the injected thermosetting adhesive agent from leakage on one end side of the ferrule 27 where the multicore optical fiber 25 extends out (the side where the boot 29 is provided; the operator side), the holder heating unit 9 is inclined as shown in FIG. 5C such that the opposite side of the ferrule (the opposite side to the operator side) where the end faces of the bare optical fibers 25A of the multicore optical fiber 25 are located is set to a slightly lower level than the one end side. Then, in the state where the ferrule 27 is inclined, the ferrule 27 is heated by the holder heating unit 9 to harden the injected thermosetting adhesive agent, whereby the multicore optical fiber 25 is adhered and fixed to the ferrule 27 of the MT connector 23.

Thereafter, the MT connector 23 and the multicore optical fiber 25 are taken away from the ferrule heating apparatus 1. According to the ferrule heating apparatus 1, the holder heating unit 9 provided with the holder 5 for housing the ferrule 27 of the MT connector 23 and the temperature control unit 11 for controlling the temperature of this holder heating unit 9 are separately disposed. In other words, the temperature control unit 11 is not provided below the holder heating unit 9. Therefore, when the ferrule heating apparatus 1 is installed on the work table, it is possible to reduce the height from the upper face of this work table to the holder lower than the conventional ferrule heating apparatus (the one having the temperature control unit under the holder heating unit) by about 170 mm down to about 80 mm, for example. Accordingly, operations become easier for the operator when the operator houses the ferrule 27 to be heated into the holder 5 of the ferrule heating apparatus 1 and takes the heated ferrule 27 away from the holder 5 while sitting on a chair designed for this work table.

Moreover, according to the ferrule heating apparatus 1, when the ferrule 27 is heated to adhere the multicore optical fiber 25 to the ferrule 27 of the MT connector 23, it is possible to heat the ferrule 27 while setting the side where the multicore optical fiber 25 does not extend out to the slightly lower level than the extending side. Therefore, it is possible to prevent the thermosetting adhesive agent from leakage on the side of the ferrule where the multicore optical fiber 25 extends out during the heating process. Note that the thermosetting adhesive agent generally loses viscosity and becomes more fluidal immediately after heating due to a temperature increase.

Moreover, by allowing the thermosetting adhesive agent to leak out and get hardened on the side of the ferrule 27 of the MT connector 23 where the multicore optical fiber extends out, it is possible to prevent the multicore optical fiber 25 existing in the boot 29 of the MT connector 23 or in the vicinity thereof from hardening and thereby losing flexibility. Moreover, it is also possible to avoid a trouble that the quantity of the thermosetting adhesive agent runs short because of the leakage of the thermosetting adhesive agent on the side of the ferrule 27 of the MT connector 23 where the multicore optical fiber 25 extends out, and that the bare optical fibers 25A inserted into the through holes 27A of the ferrule 27 fail to be adhered and fixed.

Here, when the ferrule 27 is heated, even if the thermosetting adhesive agent leaks out and get hardened on the side of the ferrule 27 where the multicore optical fiber 25 does not extend, the end face of the ferrule on the side where the multicore optical fiber 25 does not extend out is ground after hardening. Accordingly, it is possible to avoid a trouble that the end faces of the bare optical fibers remain covered with the adhesive agent which leaked out and got hardened.

When the greater part of the adhesive agent is hardened and the volume thereof is decreased after heating, the adhesive agent may be additionally injected from the adhesive agent injection hole 27D as appropriate so as to supplement the decrease. Then, the ferrule 27 may be set horizontal by setting the holder heating unit 9 horizontal as shown in FIG. 5B. Thereafter, the ferrule 27 is heated by the holder heating unit 9 and the additionally injected thermosetting adhesive agent is hardened. In this way, adhesion and fixation between the multicore optical fiber 25 and the ferrule 27 is more reliably performed. Meanwhile, the bare optical fibers 25A are prevented from being exposed out of the adhesive agent injection hole 27D. Thereafter, the ferrule 27 of the MT connector 23 and the multicore optical fiber 25 may be taken out of the ferrule heating apparatus 1.

Here, even if the thermosetting adhesive agent is additionally injected and the ferrule 27 is set horizontal as described above, the additionally injected thermosetting agent does not leak out on the side of the ferrule 27 where the multicore optical fiber 25 extends out (the boot 29 side). It is because a flow passage (such as a flow passage formed as a small gap between the multicore optical fiber 25 and the ferrule 27) for the thermosetting adhesive agent on the side of the ferrule 27 where the multicore optical fiber 25 extends out either disappears or becomes extremely narrow due to heating before additional injection of the thermosetting adhesive agent and the like.

Modified Example of Pressing Mechanism

Figure 14:
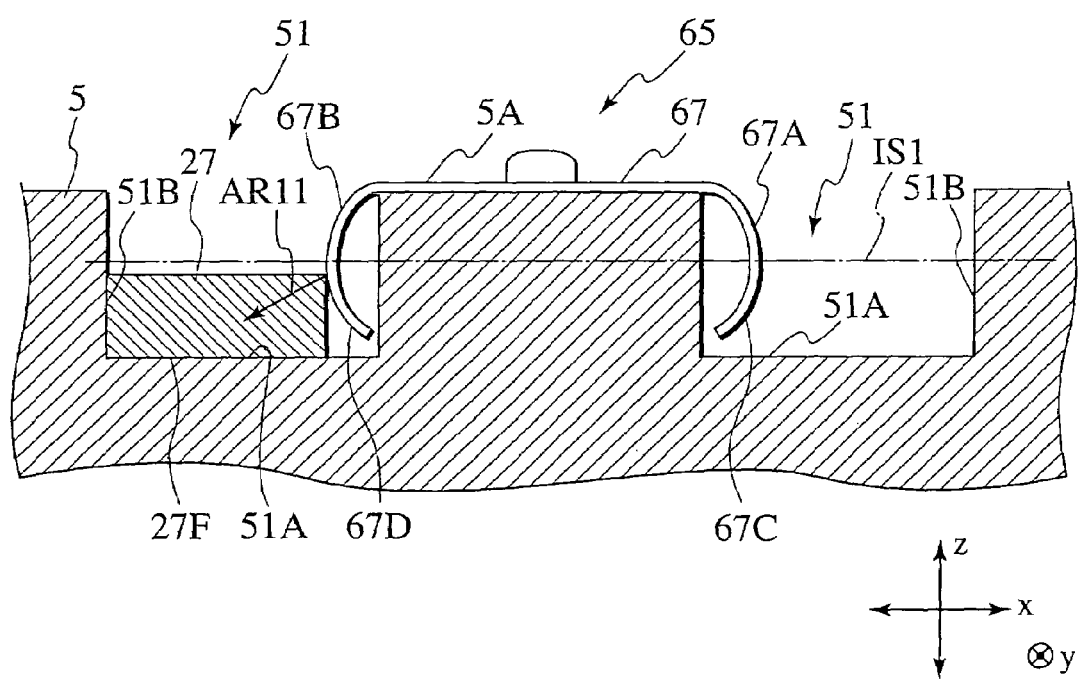
FIG. 14 is a view for explaining a modified example of a thrusting mechanism of the ferrule heating apparatus.

Description will be made regarding a modified example of the thrusting mechanism 49 for pressing the ferrule 27 against the holder 5 for retention. FIG. 14 is a view for explaining a thrusting mechanism 65, which is a modified example of the thrusting mechanism of the ferrule heating apparatus 1. The thrusting mechanism 65 is different from the thrusting mechanism 49 in that the curved portions extending toward the ferrule aligning grooves 51 are changed from the portions of the elastic member 53 of the thrusting mechanism 49. Other aspects of the thrusting mechanism 65 are configured as substantially similar to the thrusting mechanism 49.

As shown in FIG. 14, an imaginary surface IS1 is assumed herein, which is separated from the ferrule heating surface by a distance slightly greater than the thickness dimension of the ferrule 27. Of portions of an elastic member 67 of the thrusting mechanism 65, each curved portion 67A is formed into a shape such that a base portion 67A or 67B, i.e. a portion before reaching the imaginary face IS1, is formed so as to approach a ferrule position regulating portion 51B as the elastic member 67 approaches a ferrule heating surface 51A, and that a tip portion 67C or 67D, i.e. a potion after reaching the imaginary face IS1, is formed so as to move away from the ferrule position regulating portion 51B as the elastic member 67 approaches the ferrule heating surface 51A. In other words, each of the curved portions 67A has a curved face which approaches most closely to the ferrule location regulating portion 51B in the vicinity of the imaginary surface IS1, and the curved portion 67A is preferably formed approximately symmetrical with respect to the imaginary surface IS1.

When the ferrule 27 is aligned and retained in the ferrule aligning groove 51, force acts on the ferrule 27 to press the ferrule 27 obliquely against the ferrule heating surface 51A at the tip portion 67C or 67D as indicated with an arrow AR11. Therefore, the action AR11 generates force to thrust the ferrule 27 against the ferrule location regulating portion 51B (in the x-direction) and force to thrust the ferrule 27 against the ferrule heating surface 51A (in the z-direction). Accordingly, it is possible to achieve plane contact of the ferrule 27 with the ferrule position regulating portion 51B and the ferrule heating surface 51A more reliably. Here, a curved portion 67B is formed symmetrically to the curved portion 67A.

Figure 15:
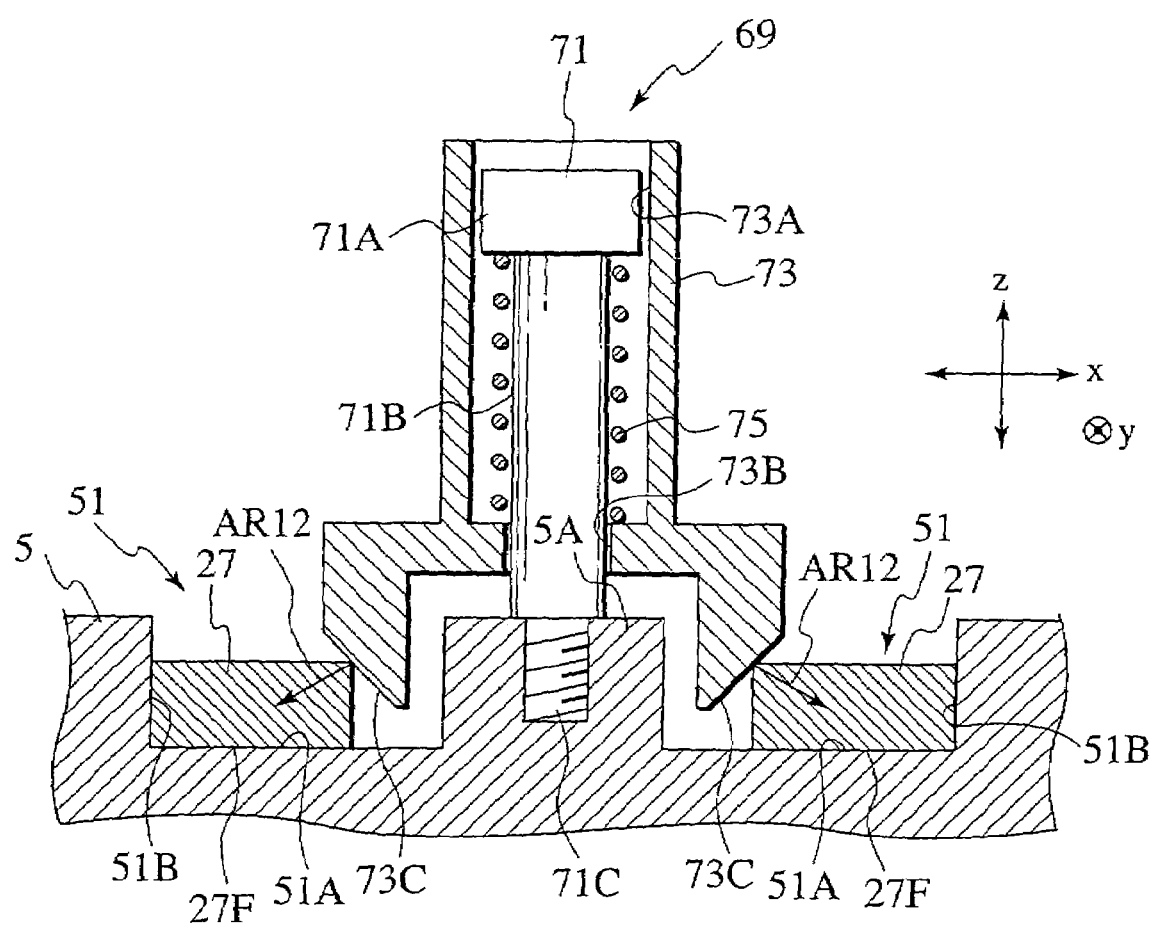
FIG. 15 is a view for explaining another modified example of the thrusting mechanism of the ferrule heating apparatus.

FIG. 15 is a view for explaining a thrusting mechanism 69, which is another modified example of the thrusting mechanism of the ferrule heating apparatus 1. The thrusting mechanism 69 applies a coil spring instead of the platy elastic member so as to achieve plane contact of the ferrule 27 with the ferrule position regulating portion 51B and the ferrule heating surface 51A.

The pressing mechanism 69 includes a supporting member 71 standing up from the upper face 5A of the holder 5 without formation of the ferrule aligning grooves 51 and thereby being integrally provided to the holder 5, a pressurizing member 73 which is engaged with this supporting member 71 so as to be slidable in the perpendicular direction (the z-direction) to the upper face 5A of the holder 5, and a compression spring 75 for energizing the pressurizing member 73 downward in the z-direction to retain the ferrule 27.

Here, the supporting member 71 includes a first guiding portion 71A of a cylindrical shape, a second guiding portion 71B being provided on a lower end side of the first guiding portion 71A and formed into a cylindrical shape having an outline smaller than the first guiding portion 71A, and a screw portion 71C being provided on a lower end side of this second guiding portion 71B for fixing the supporting member 71 to the holder 5. Here, the central axis of the first guiding portion 71A and the central axis of the second guiding portion 71B approximately coincide with each other.

The pressurizing member 73 includes a first guiding portion 73A of a tubular shape which has an inside diameter slightly larger than the outline of the first guiding portion 71A of the supporting member 71 and is slidably engaged with the first guiding portion 71A, a second guiding portion 73B of a tubular shape provided on a lower end side of this first guiding portion 73A, which has an inside diameter slightly larger than the outline of the second guiding portion 71B of the supporting member 71 and is slidably engaged with the second guiding portion 71B. In addition, a pressurizing portion 73C having a plane that faces the heating surface 51A and the ferrule location regulating portion 51B is formed on a lower end side of the first guiding portion 71A. The pressurizing portion 73C has the plane which intersects with both of the heating surface 51A and the ferrule location regulating portion 51B, and functions as similar to the tip portion 67C or 67D of the pressing mechanism 65 because elasticity is imparted by the spring 75. Here, the central axis of the first guiding portion 73A and the central axis of the second guiding portion 73B approximately coincide with each other.

The compression spring 75 is provided in a space between the first guiding portion 71A and a bottom face of the second guiding portion 73B and in the outer periphery of second guiding member 71B of the supporting member 71. Moreover, the pressurizing member 73 is energized downward in the z-direction by this compression spring 75, and the pressurizing portion 73C of the pressurizing member 73 presses the ferrule 27 housed in the ferrule locating groove 51 obliquely as shown in an arrow AR12. By pressing in this way, the ferrule 27 is pressed against the ferrule location regulating portion 51B (in the x-direction) and against the ferrule heating surface 51A (in the z-direction). Accordingly, it is possible to achieve plane contact of the ferrule 27 with the ferrule location regulating portion 51B and the ferrule heating surface 51A more reliably.

Second Embodiment

Figure 3:
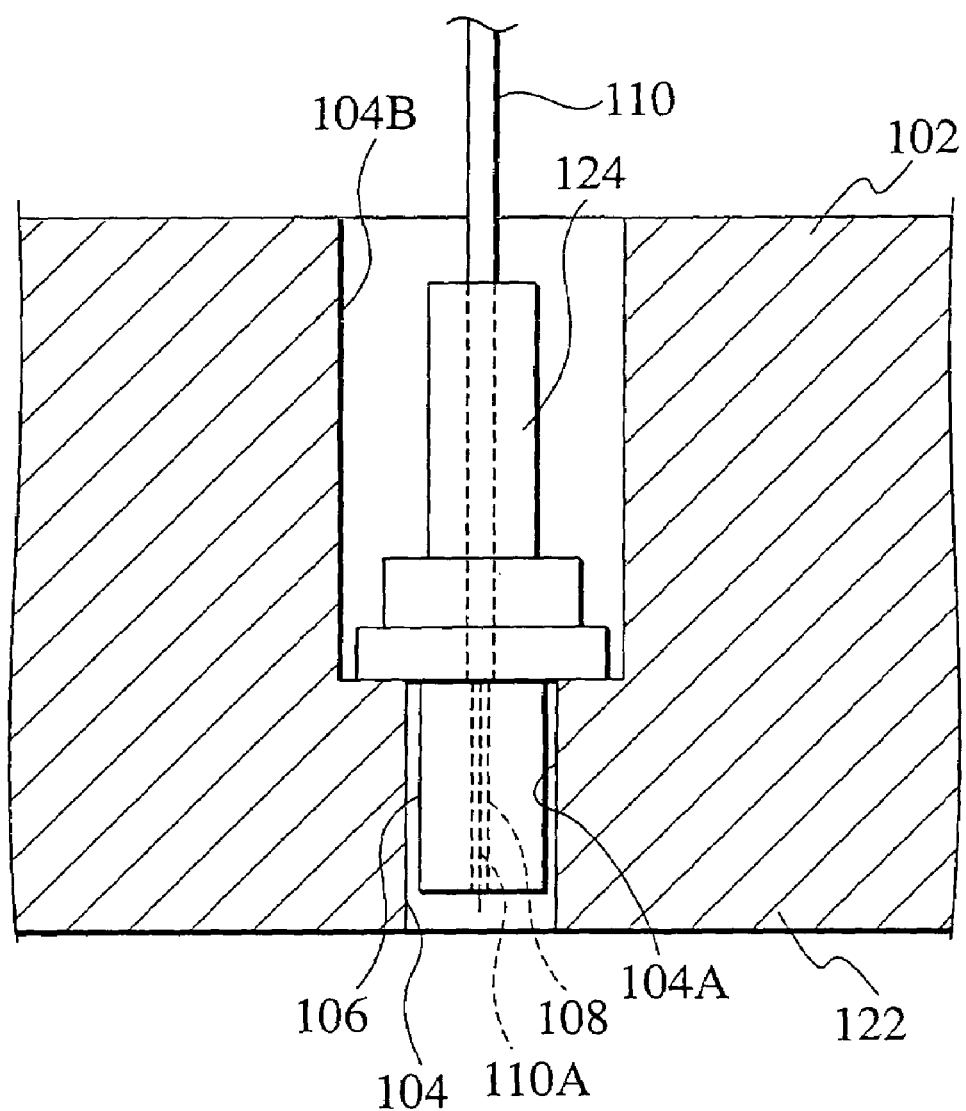
FIG. 3 is an enlarged cross-sectional view showing a state where the ferrules in which the optical fibers are inserted are housed and aligned in a plurality of ferrule housing holes provided on the holder of the previously disclosed ferrule heating apparatus.
Figure 16:
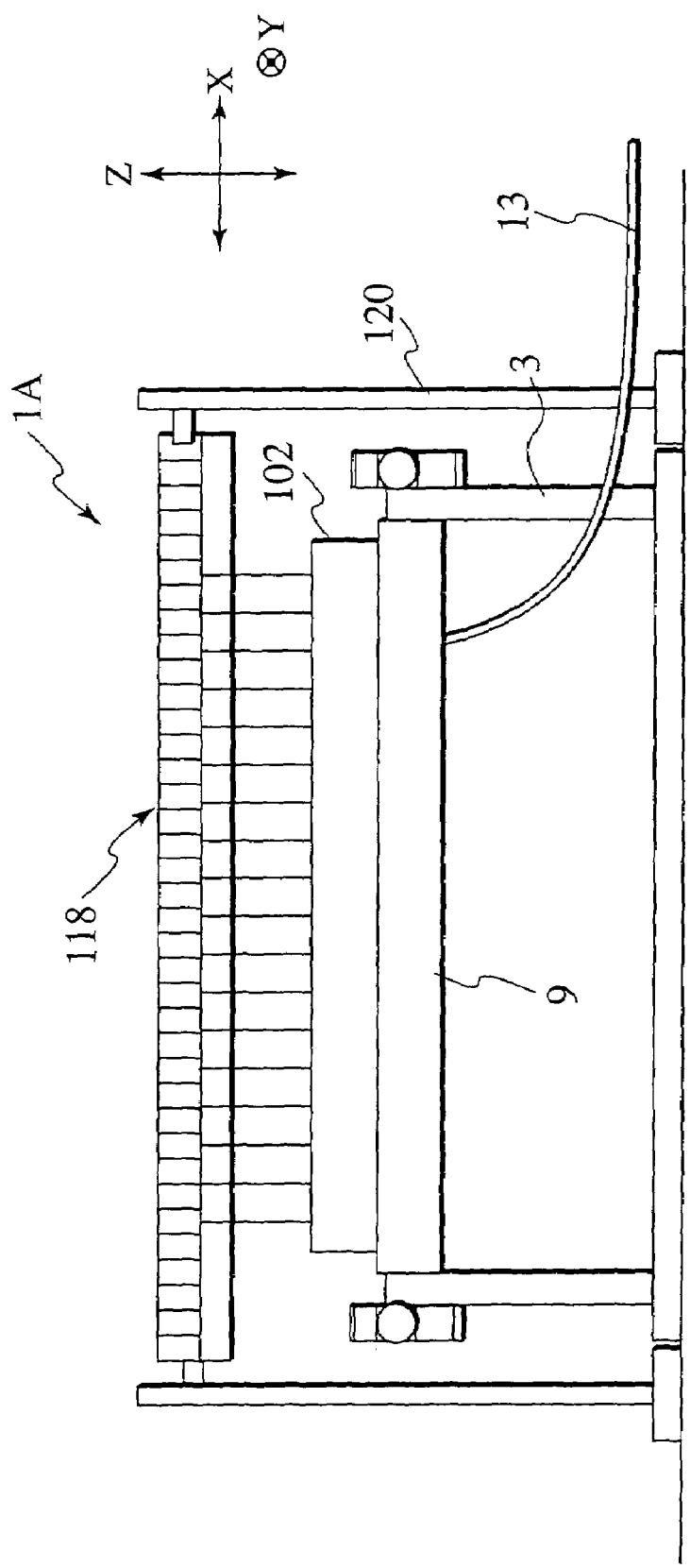
FIG. 16 is a view showing a schematic constitution of a ferrule heating apparatus according to a second embodiment of the present invention.

FIG. 16 is a view showing a schematic constitution of a ferrule heating apparatus 1A according to a second embodiment of the present invention. The ferrule heating apparatus 1A is a system for adhering and fixing one end face of an optical fiber 110 to a tubular ferrule as shown in FIG. 3.

The ferrule heating apparatus 1A is different from the ferrule heating apparatus 1 according to the first embodiment in the following points. Specifically, the heat insulating cover 17 is removed from the ferrule heating apparatus 1 according to the first embodiment. The holder 102 of the conventional ferrule heating apparatus 100 is provided continuously with the holder heating unit 9 instead of the holder 5. Moreover, the optical fiber retaining means 118 of the conventional ferrule heating apparatus 100 is provided in order to retain the optical fibers extending upward from the ferrules (of which axes are oriented vertically) which are housed in the holder 102. Other aspects of the ferrule heating apparatus 1A are configures as substantially similar to the ferrule heating apparatus 1 according to the first embodiment. Therefore, the ferrule heating apparatus 1A exerts effects substantially similar to those of the ferrule heating apparatus 1. Here, in the ferrule heating apparatus 1A, the holder 102 may be fixed so as not to rotate relative to the base frame 3.

It is also possible to constitute the ferrule heating apparatus 1A by arranging the ferrule heating apparatus 1 by configuring the holder 5 to be detachable from the holder heating unit 9, installing the holder 5 instead of the holder 118, and providing the optical fiber retaining means 118.

Meanwhile, in the ferrule heating apparatus 1A, the base frame 3 for supporting the holder heating unit 9 and the base frames 120 for supporting the optical fiber retaining means 118 are individual members. However, it is also possible to combine these base frames 3 and 120 into one member.

By the constitution described above, types of holders can be freely changed (easily changed) in accordance with aspects of ferrules or aspects of connectors for connecting optical fibers supported by the ferrules. Accordingly, it is possible to shorten adjustment time when the aspect of the ferrule or the aspect of connector for connecting optical fibers supported by the ferrule is changed. Moreover, it is also possible to use the ferrule heating apparatus for adhesion of various types of ferrules. Furthermore, it is possible to provide the ferrule heating apparatus for use in adhesion of various types of ferrules at low costs.

Third Embodiment

Figure 17:
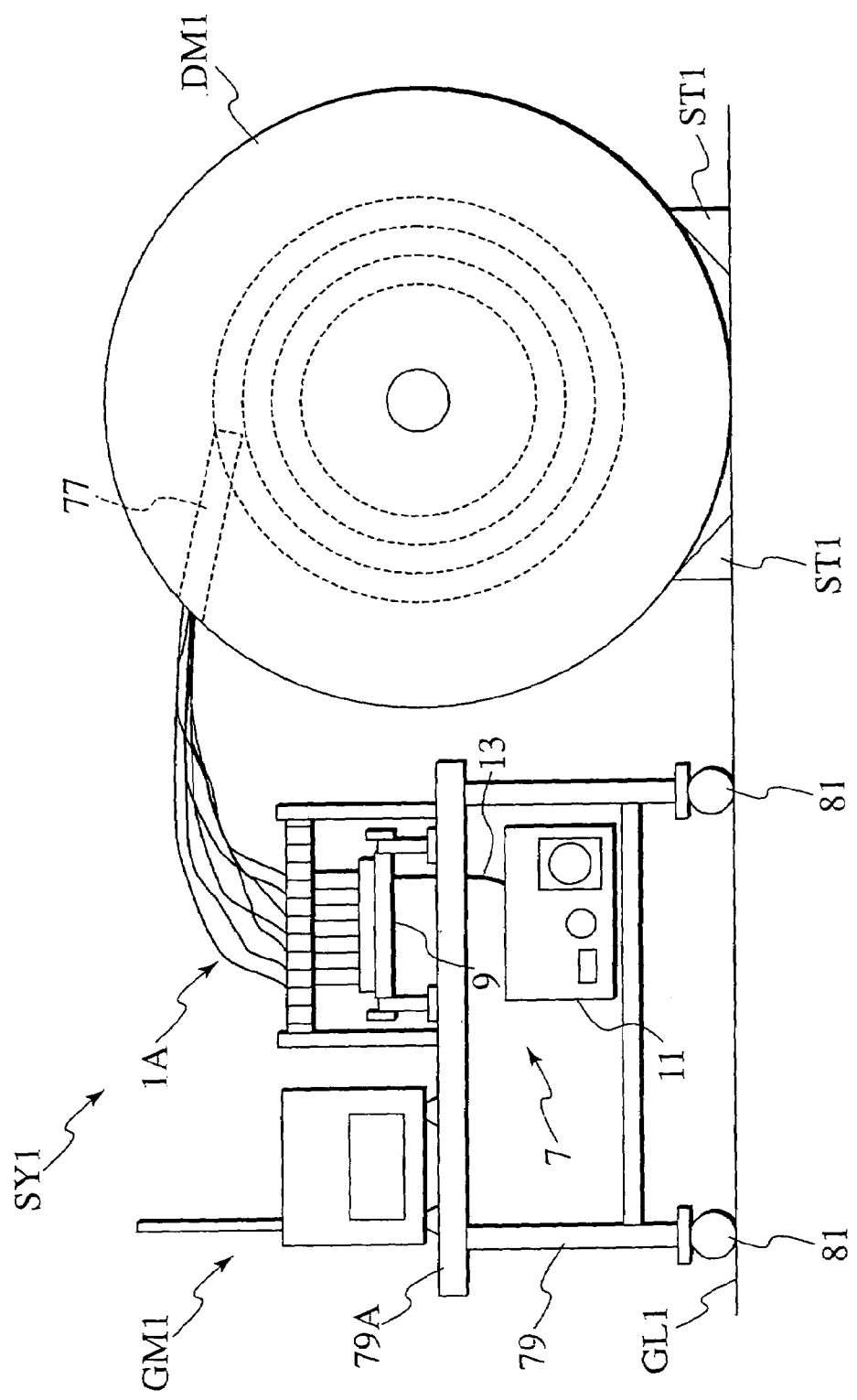
FIG. 17 is a view showing a schematic constitution of an optical fiber end portion processing system according to a third embodiment of the present invention.

FIG. 17 is a view showing a schematic constitution of an optical fiber end portion processing system SY1 according to a third embodiment of the present invention. The optical fiber end portion processing system SY1 has a configuration of providing a work table 79 with the ferrule heating apparatus 1A according to the second embodiment and a grinder machine GM1 for grinding an end face of a ferrule to which one end portions of an optical fiber is adhered and fixed, and an end face of the optical fiber. Here, casters 81 are provided under the work table 79, whereby the work table 79 can move on a floor surface GL1 easily.

The temperature control unit 11 of the ferrule heating apparatus 1A is disposed under a face plate 79A of the work table 79, and portions of the ferrule heating apparatus 1A excluding the heat control unit 11 and the grinder machine GM1 are disposed on the face plate 79A of the work table 79.

Alternatively, it is also possible to provide the ferrule heating apparatus 1 according to the first embodiment on the face plate 79A of the work table 79 instead of or together with the ferrule heating apparatus 1A.

When the ferrules are adhered and fixed to the end faces of the optical fibers, the optical fibers extending from the ferrules constitute an optical cable 77. Moreover, this optical cable 77 extends long for transmitting information in a long distance. Accordingly, the optical cable 77 is generally wound around a large-size optical cable drum DM1. This large-size drum DM1 is heavy and is thereby difficult to move. The large-size drum DM1 is fixed on the floor surface GL1 with stoppers ST1, for example, so as not to roll thereon.

Accordingly, upon processing end faces of the optical fibers of the optical cable wound around the optical cable drum DM1, the work table 79 is moved close to the optical cable drum DM1 instead of moving the optical cable drum DM1. The ferrules are adhered and fixed to the end faces of the optical fibers by use of the ferrule heating apparatus 1A. Moreover, the end faces of the ferrules adhered and fixed to the optical fibers (the end faces on the side where the optical fibers do not extend out) are ground by the grinder machine GM1.

According to the above-described operation, it is not necessary to move the heavy optical cable drum DM1. Instead, it is satisfactory to move the work table 79 equipped with the casters 81. Therefore, one operator can readily perform the operation, and it is possible to reduce workloads of the operator.

The present invention exerts an effect that an operator can easily operate a ferrule heating apparatus for heating a ferrule to adhere and fix a ferrule, in which an optical fiber is inserted, and the optical fiber integrally together when the ferrule heating apparatus is disposed on a work table and when the operator houses a pre-heating ferrule into a holder of the ferrule heating apparatus and takes the heated ferrule out of the holder while sitting on a chair designed for this work table.

This application claims benefit of priority under 35USC §119 to Japanese Patent Applications No. 2002-187051, filed on Jun. 27, 2002, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A ferrule heating apparatus configured to allow one end side of an optical fiber to be inserted into an optical fiber insertion through hole being provided on a ferrule, and to heat the ferrule while having a thermosetting adhesive agent between an inner peripheral surface of the optical fiber insertion through hole and the optical fiber, and thereby to adhere the optical fiber and the ferrule together, the ferrule heating apparatus comprising:

a thermally conductive holder having a plurality of ferrule housing portions for aligning and housing the ferrules;

a holder heating unit configured to support and heat the holder, the holder and the holder heating unit being inclinable with respect to a horizontal plane; and a control unit configured to supply electricity to the holder heating unit and to control a heating temperature of the holder heating unit, the control unit being disposed separately from the holder heating unit.

2. The ferrule heating apparatus according to claim 1, wherein the holder is configured to be freely fitted to and detached from the holder heating unit, and the holder is changeable in accordance with any of an aspect of the ferrule and an aspect of a connector for connecting an optical fiber supported by the ferrule.

3. The ferrule heating apparatus according to claim 1, wherein the holder further comprises a thrusting mechanism configured to align the ferrule for retention such that a surface to be heated of the ferrule contacts a ferrule heating surface of the ferrule housing portion.

4. A ferrule heating apparatus configured to allow one end side of an optical fiber to be inserted into an optical fiber insertion through hole being provided on a ferrule, and to heat the ferrule while having a thermosetting adhesive agent between an inner peripheral surface of the optical fiber insertion through hole and the optical fiber, and thereby to adhere the optical fiber and the ferrule together, the ferrule heating apparatus comprising:

a thermally conductive holder having a plurality of ferrule housing portions for aligning and housing the ferrules, wherein the ferrule housing portion includes a ferrule position regulating portion having a plane intersecting with the ferrule heating surface;

a holder heating unit configured to support and heat the holder;

a control unit configured to supply electricity to the holder heating unit and to control a heating temperature of the holder heating unit, the control unit being disposed separately from the holder heating unit; and a thrusting mechanism configured to align the ferrule for retention such that a surface to be heated of the ferrule contacts a ferrule heating surface of the ferrule housing portion, wherein the thrusting mechanism includes an elastic member configured to energize and press the ferrule in a direction of the ferrule position regulating portion; and the elastic member has a curved surface being curved such that a approach degree of a tip end side of the elastic member to the ferrule heating surface grows more as the elastic member approaches the ferrule position regulating portion.

5. A ferrule heating apparatus configured to allow one end side of an optical fiber to be inserted into an optical fiber insertion through hole being provided on a ferrule, and to heat the ferrule while having a thermosetting adhesive agent between an inner peripheral surface of the optical fiber insertion through hole and the optical fiber, and thereby to adhere the optical fiber and the ferrule together, the ferrule heating apparatus comprising:

a thermally conductive holder having a plurality of ferrule housing portions for aligning and housing the ferrules, wherein the ferrule housing portion includes a ferrule position regulating portion having a plane intersecting with the ferrule heating surface;

a holder heating unit configured to support and heat the holder;

a control unit configured to supply electricity to the holder heating unit and to control a heating temperature of the holder heating unit, the control unit being disposed separately from the holder heating unit; and a thrusting mechanism configured to align the ferrule for retention such that a surface to be heated of the ferrule contacts a ferrule heating surface of the ferrule housing portion, wherein the thrusting mechanism includes a thrusting portion provided with elasticity and configured to energize and press the ferrule in a direction of the ferrule location regulating portion; and the thrusting portion has a curved surface configured such that the thrusting portion becomes more distant from the ferrule position regulating portion as a tip portion of the thrusting portion approaches the ferrule heating surface, and that the tip portion pressurizes the ferrule.

* * * * *